United States Patent
Boylan, III et al.

(10) Patent No.: US 9,148,703 B2
(45) Date of Patent: *Sep. 29, 2015

(54) INTERACTIVE TELEVISION SYSTEM WITH PROGRAMMING-RELATED LINKS

(71) Applicant: United Video Properties, Inc., Santa Clara, CA (US)

(72) Inventors: Peter C. Boylan, III, Tulsa, OK (US); Michael D. Ellis, Boulder, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,074

(22) Filed: Sep. 22, 2014

(65) Prior Publication Data

US 2015/0012944 A1 Jan. 8, 2015

Related U.S. Application Data

(63) Continuation of application No. 11/894,642, filed on Aug. 20, 2007, now Pat. No. 8,843,963, which is a continuation of application No. 10/923,265, filed on Aug. 20, 2004, now abandoned, which is a (Continued)

(51) Int. Cl.
*G06F 3/00* (2006.01)
*H04N 5/445* (2011.01)
(Continued)

(52) U.S. Cl.
CPC .......... *H04N 21/4722* (2013.01); *G06F 3/0482* (2013.01); *H04N 5/44543* (2013.01);
(Continued)

(58) Field of Classification Search
CPC . H04N 5/44543; H04N 21/482; H04N 21/84; H04N 21/4821; H04N 21/4345; H04N 21/4622; H04N 21/47214; H04N 21/4316; H04N 21/47
USPC ............................................... 725/39–44, 52
See application file for complete search history.

(56) References Cited

U.S. PATENT DOCUMENTS 3,440,427 A 4/1969 Kammer
3,492,577 A 1/1970 Reiter et al.
(Continued)

FOREIGN PATENT DOCUMENTS

CA 2223057 12/1996
CA 2232003 4/1997
(Continued)

OTHER PUBLICATIONS

"A New Approach to Addressability," CableData product brochure, 9 pages, undated.
(Continued)

*Primary Examiner* — Ngoc Vu
(74) *Attorney, Agent, or Firm* — Ropes & Gray LLP

(57) ABSTRACT

An interactive television system with programming-related links is provided. The system may include user television equipment on which interactive program guide and non-program-guide applications may be implemented. Information that is displayed in a display screen for a non-program-guide application may be related to programming. A display screen or overlay for programming that is related to the information may be displayed when a user selects the displayed information. The display or overlay for the programming may include advertisements, video, graphics, options, or programming descriptions. The display screen or overlay may have been displayed by the program guide application.

20 Claims, 18 Drawing Sheets

Related U.S. Application Data continuation of application No. 09/699,207, filed on Oct. 27, 2000, now abandoned.

(60) Provisional application No. 60/165,610, filed on Nov. 15, 1999, provisional application No. 60/162,484, filed on Oct. 29, 1999.

(51) Int. Cl.

| | |
|---|---|
| *H04N 21/4722* | (2011.01) |
| *G06F 3/0482* | (2013.01) |
| *H04N 7/16* | (2011.01) |
| *H04N 7/173* | (2011.01) |
| *H04N 21/431* | (2011.01) |
| *H04N 21/482* | (2011.01) |
| *H04N 21/488* | (2011.01) |
| *H04N 21/81* | (2011.01) |
| *H04N 21/84* | (2011.01) |
| *H04N 21/472* | (2011.01) |
| *H04N 21/475* | (2011.01) |
| *H04N 21/8545* | (2011.01) |
| *H04N 21/858* | (2011.01) |

(52) U.S. Cl.
CPC ............ *H04N7/163* (2013.01); *H04N 7/17318* (2013.01); *H04N 21/4312* (2013.01); *H04N 21/4314* (2013.01); *H04N 21/4755* (2013.01); *H04N 21/47214* (2013.01); *H04N 21/482* (2013.01); *H04N 21/488* (2013.01); *H04N 21/4821* (2013.01); *H04N 21/4828* (2013.01); *H04N 21/8133* (2013.01); *H04N 21/84* (2013.01); *H04N 21/858* (2013.01); *H04N 21/8545* (2013.01)

(56) References Cited

U.S. PATENT DOCUMENTS

| | | |
|---|---|---|
| 3,493,674 A | 2/1970 | Houghton |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,162,516 A | 7/1979 | Becker |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,270,145 A | 5/1981 | Farina |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,337,480 A | 6/1982 | Bourassin et al. |
| 4,337,482 A | 6/1982 | Coutta |
| 4,337,483 A | 6/1982 | Guillou |
| 4,344,090 A | 8/1982 | Belisomi et al. |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,581 A | 1/1984 | Schweppe et al. |
| 4,429,385 A | 1/1984 | Cichelli et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,523,228 A | 6/1985 | Banker |
| 4,533,910 A | 8/1985 | Sukonick et al. |
| 4,536,791 A | 8/1985 | Campbell et al. |
| 4,547,804 A | 10/1985 | Greenberg |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,620,229 A | 10/1986 | Amano et al. |
| 4,622,545 A | 11/1986 | Atkinson |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,706,121 A | 11/1987 | Young |
| 4,712,105 A | 12/1987 | Kohler |
| RE32,632 E | 3/1988 | Atkinson |
| 4,748,618 A | 5/1988 | Brown et al. |
| 4,750,036 A | 6/1988 | Martinez |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,821,102 A | 4/1989 | Ichikawa et al. |
| 4,829,558 A | 5/1989 | Welsh |
| 4,847,604 A | 7/1989 | Doyle |
| 4,847,700 A | 7/1989 | Freeman |
| 4,862,268 A | 8/1989 | Campbell et al. |
| 4,873,623 A | 10/1989 | Lane et al. |
| 4,884,223 A | 11/1989 | Ingle et al. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,908,707 A | 3/1990 | Kinghorn |
| 4,908,713 A | 3/1990 | Levine |
| 4,914,517 A | 4/1990 | Duffield |
| 4,914,732 A | 4/1990 | Henderson et al. |
| 4,931,783 A | 6/1990 | Atkinson |
| 4,935,865 A | 6/1990 | Rowe et al. |
| 4,937,821 A | 6/1990 | Boulton |

(56) References Cited

U.S. PATENT DOCUMENTS

| | | |
|---|---|---|
| 4,939,507 A | 7/1990 | Beard et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,995,078 A | 2/1991 | Monslow et al. |
| 5,008,853 A | 4/1991 | Bly et al. |
| 5,014,125 A | 5/1991 | Pocock et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,103,314 A | 4/1992 | Keenan |
| 5,148,154 A | 9/1992 | MacKay et al. |
| 5,151,782 A | 9/1992 | Ferraro |
| 5,151,789 A | 9/1992 | Young |
| 5,155,806 A | 10/1992 | Hoeber et al. |
| 5,157,768 A | 10/1992 | Hoeber et al. |
| 5,177,604 A | 1/1993 | Martinez |
| 5,195,092 A | 3/1993 | Wilson et al. |
| 5,206,722 A | 4/1993 | Kwan |
| 5,210,611 A | 5/1993 | Yee et al. |
| 5,214,622 A | 5/1993 | Nemoto et al. |
| 5,220,420 A | 6/1993 | Hoarty et al. |
| 5,223,924 A | 6/1993 | Strubbe |
| 5,231,493 A | 7/1993 | Apitz |
| RE34,340 E | 8/1993 | Freeman |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,239,540 A | 8/1993 | Rovira et al. |
| 5,247,347 A | 9/1993 | Litteral et al. |
| 5,247,364 A | 9/1993 | Banker et al. |
| 5,253,066 A | 10/1993 | Vogel |
| 5,253,067 A | 10/1993 | Chaney et al. |
| 5,283,819 A | 2/1994 | Glick et al. |
| 5,323,240 A | 6/1994 | Amano et al. |
| 5,335,277 A | 8/1994 | Harvey et al. |
| 5,353,121 A | 10/1994 | Young et al. |
| 5,357,276 A | 10/1994 | Banker et al. |
| 5,367,316 A | 11/1994 | Ikezaki |
| 5,382,983 A | 1/1995 | Kwoh et al. |
| 5,387,945 A | 2/1995 | Takeuchi |
| 5,404,393 A | 4/1995 | Remillard |
| 5,410,326 A | 4/1995 | Goldstein |
| 5,477,262 A | 12/1995 | Banker et al. |
| 5,479,268 A | 12/1995 | Young et al. |
| 5,481,542 A | 1/1996 | Logston et al. |
| 5,483,278 A | 1/1996 | Strubbe et al. |
| 5,485,221 A | 1/1996 | Banker et al. |
| 5,523,796 A | 6/1996 | Marshall et al. |
| 5,528,304 A | 6/1996 | Cherrick et al. |
| 5,532,754 A | 7/1996 | Young et al. |
| 5,559,548 A | 9/1996 | Davis et al. |
| 5,559,549 A | 9/1996 | Hendricks et al. |
| 5,583,560 A | 12/1996 | Florin et al. |
| 5,585,866 A | 12/1996 | Miller et al. |
| 5,589,892 A | 12/1996 | Knee et al. |
| 5,594,509 A | 1/1997 | Florin et al. |
| 5,596,373 A | 1/1997 | White et al. |
| 5,600,364 A | 2/1997 | Hendricks et al. |
| 5,600,573 A | 2/1997 | Hendricks et al. |
| 5,621,456 A | 4/1997 | Florin et al. |
| 5,635,978 A | 6/1997 | Alten et al. |
| 5,635,979 A | 6/1997 | Kostreski et al. |
| 5,650,826 A | 7/1997 | Eitz |
| 5,659,350 A | 8/1997 | Hendricks et al. |
| 5,663,757 A | 9/1997 | Morales |
| 5,677,708 A | 10/1997 | Matthews, III et al. |
| 5,682,195 A | 10/1997 | Hendricks et al. |
| 5,689,799 A | 11/1997 | Dougherty et al. |
| 5,699,107 A | 12/1997 | Lawler et al. |
| 5,734,853 A | 3/1998 | Hendricks et al. |
| 5,740,549 A | 4/1998 | Reilly et al. |
| 5,760,821 A | 6/1998 | Ellis et al. |
| 5,771,064 A | 6/1998 | Lett |
| 5,781,246 A | 7/1998 | Alten et al. |
| 5,798,785 A | 8/1998 | Hendricks et al. |
| 5,801,787 A | 9/1998 | Schein et al. |
| 5,808,608 A | 9/1998 | Young et al. |
| 5,835,843 A | 11/1998 | Haddad |
| 5,848,352 A | 12/1998 | Dougherty et al. |
| 5,850,218 A | 12/1998 | LaJoie et al. |
| 5,874,985 A | 2/1999 | Matthews, III |
| 5,897,623 A | 4/1999 | Fein et al. |
| 5,907,323 A | 5/1999 | Lawler et al. |
| 5,914,746 A | 6/1999 | Matthews, III et al. |
| 5,940,073 A * | 8/1999 | Klosterman et al. .......... 715/721 |
| 5,959,688 A | 9/1999 | Schein et al. |
| 5,990,927 A | 11/1999 | Hendricks et al. |
| 6,163,316 A | 12/2000 | Killian |
| 6,172,677 B1 | 1/2001 | Stautner et al. |
| 6,177,931 B1 | 1/2001 | Alexander et al. |
| 6,188,995 B1 | 2/2001 | Garst et al. |
| 6,208,799 B1 | 3/2001 | Marsh et al. |
| 6,209,025 B1 | 3/2001 | Bellamy |
| 6,230,325 B1 | 5/2001 | Iinuma et al. |
| 6,240,555 B1 * | 5/2001 | Shoff et al. .................. 725/110 |
| 6,263,501 B1 | 7/2001 | Schein et al. |
| 6,282,714 B1 | 8/2001 | Ghori et al. |
| 6,313,851 B1 | 11/2001 | Matthews, III et al. |
| 6,317,885 B1 | 11/2001 | Fries |
| 6,388,714 B1 | 5/2002 | Schein et al. |
| 6,408,437 B1 | 6/2002 | Hendricks et al. |
| 6,469,753 B1 | 10/2002 | Klosterman et al. |
| 6,505,348 B1 | 1/2003 | Knowles et al. |
| 6,510,557 B1 | 1/2003 | Thrift |
| 6,600,503 B2 | 7/2003 | Stautner et al. |
| 6,665,869 B1 | 12/2003 | Ellis et al. |
| 6,668,278 B1 | 12/2003 | Yen et al. |
| 6,717,590 B1 | 4/2004 | Sullivan |
| 6,725,461 B1 | 4/2004 | Dougherty et al. |
| 6,732,179 B1 | 5/2004 | Brown et al. |
| 6,735,487 B1 | 5/2004 | Marshall et al. |
| 6,763,522 B1 | 7/2004 | Kondo et al. |
| 6,772,433 B1 | 8/2004 | LaJoie et al. |
| 6,978,473 B1 | 12/2005 | Nsonwu et al. |
| 7,062,777 B2 | 6/2006 | Alba et al. |
| 7,624,410 B2 | 11/2009 | Ellis et al. |
| 7,805,742 B2 | 9/2010 | Ellis et al. |
| 8,255,952 B2 * | 8/2012 | Boylan et al. .................... 725/42 |
| 8,843,963 B2 * | 9/2014 | Boylan et al. .................... 725/42 |
| 2002/0059599 A1 | 5/2002 | Schein et al. |
| 2002/0116712 A1 | 8/2002 | Schein et al. |
| 2003/0009758 A1 | 1/2003 | Townsend et al. |
| 2003/0035007 A1 | 2/2003 | Wugofski |
| 2005/0015804 A1 | 1/2005 | LaJoie et al. |
| 2005/0028208 A1 | 2/2005 | Ellis et al. |
| 2005/0044565 A1 | 2/2005 | Jerding et al. |
| 2005/0177850 A1 | 8/2005 | Boylan et al. |
| 2005/0235319 A1 | 10/2005 | Carpenter et al. |
| 2005/0283800 A1 | 12/2005 | Ellis et al. |
| 2006/0123447 A1 | 6/2006 | Westlake et al. |
| 2008/0184301 A1 | 7/2008 | Boylan et al. |
| 2008/0271159 A1 | 10/2008 | Brown et al. |
| 2009/0049483 A1 | 2/2009 | Townsend et al. |
| 2009/0241144 A1 | 9/2009 | LaJoie et al. |
| 2011/0099573 A1 | 4/2011 | Ellis et al. |
| 2011/0209180 A1 | 8/2011 | Ellis et al. |

FOREIGN PATENT DOCUMENTS

| | | |
|---|---|---|
| CA | 2337464 | 2/2000 |
| DE | 29 18 846 | 11/1980 |
| DE | 32 46 225 | 6/1984 |
| DE | 33 37 204 | 4/1985 |
| DE | 36 21 263 | 1/1988 |
| EP | 0 337 336 | 10/1989 |

(56) References Cited

FOREIGN PATENT DOCUMENTS

| | | |
|---|---|---|
| EP | 0 393 555 | 10/1990 |
| EP | 0 396 062 | 11/1990 |
| EP | 0 401 930 | 12/1990 |
| EP | 0 408 892 | 1/1991 |
| EP | 0 420 123 | 4/1991 |
| EP | 0 477 754 | 4/1992 |
| EP | 0 477 756 | 4/1992 |
| EP | 0 492 853 | 7/1992 |
| EP | 0 532 322 | 3/1993 |
| EP | 0 572 090 | 12/1993 |
| EP | 0 575 956 | 12/1993 |
| EP | 0 721 253 | 7/1996 |
| EP | 0746119 | 12/1996 |
| EP | 0 827 340 | 3/1998 |
| EP | 0 854 645 | 7/1998 |
| EP | 1 330 125 | 7/2003 |
| EP | 2 268 019 | 12/2010 |
| FR | 2 662 895 | 12/1991 |
| GB | 2 034 995 | 6/1980 |
| GB | 2 126 002 | 3/1984 |
| GB | 2 185 670 | 7/1987 |
| GB | 2 256 546 | 12/1992 |
| JP | 58137334 | 8/1983 |
| JP | 58196738 | 11/1983 |
| JP | 59141878 | 8/1984 |
| JP | 61-50470 | 3/1986 |
| JP | 61-74476 | 4/1986 |
| JP | 62-60384 | 3/1987 |
| JP | 2-48879 | 2/1990 |
| WO | WO-86/01962 | 3/1986 |
| WO | WO-88/04507 | 6/1988 |
| WO | WO-89/12370 | 12/1989 |
| WO | WO-90/01243 | 2/1990 |
| WO | WO-90/15507 | 12/1990 |
| WO | WO-91/18476 | 11/1991 |
| WO | WO-92/04801 | 3/1992 |
| WO | WO-93/05452 | 3/1993 |
| WO | WO-93/11638 | 6/1993 |
| WO | WO-93/11639 | 6/1993 |
| WO | WO-93/11640 | 6/1993 |
| WO | WO 95/01056 | 1/1995 |
| WO | WO 95/07003 | 3/1995 |
| WO | WO 95/32585 | 11/1995 |
| WO | WO 96/09721 | 3/1996 |
| WO | WO 96/34466 | 10/1996 |
| WO | WO 96/34467 | 10/1996 |
| WO | WO 96/34491 | 10/1996 |
| WO | WO 96/41471 | 12/1996 |
| WO | WO 96/41478 | 12/1996 |
| WO | WO 97/13368 | 4/1997 |
| WO | WO 97/18675 | 5/1997 |
| WO | WO 97/20431 | 6/1997 |
| WO | WO 97/31480 | 8/1997 |
| WO | WO 97/42763 | 11/1997 |
| WO | WO 97/48230 | 12/1997 |
| WO | WO 97/49237 | 12/1997 |
| WO | WO 97/49242 | 12/1997 |
| WO | WO 98/06219 | 2/1998 |
| WO | WO 98/16028 | 4/1998 |
| WO | WO 98/17064 | 4/1998 |
| WO | WO 98/26584 | 6/1998 |
| WO | WO 98/31114 | 7/1998 |
| WO | WO 99/13641 | 3/1999 |
| WO | WO 00/05889 | 2/2000 |
| WO | WO 00/28734 | 5/2000 |

OTHER PUBLICATIONS

"Computer Network: Current Status and Outlook on Leading Science and Technology," Bureau of Science & Technology (Japan), vol. 1, Dec. 1986, 326 pages.

"Creation/Modification of the Audio Signal Processor Setup for a PC Audio Editor," IBM Technical Disclosure Bulletin, vol. 30, No. 10, Mar. 1988, pp. 367-376.

"D2B—Home Bus für Audio and Video," Selektor, No. 4, Apr. 1990, pp. 10, 12.

"Interactive Computer Conference Server," IBM Technical Disclosure Bulletin, vol. 34, No. 7A, Dec. 1991, pp. 375-377.

"Interface Device for Conventional TVs to Improve Functionality," IBM Technical Disclosure Bulleting, Vo. 36, No. 7, Jul. 1993, pp. 53-54.

"MSI Datacasting Systems," TV Communications Journal, Jan. 1973, 2 pages.

"The New Media and Broadcast Policy: An Investigation & Research Conference Report on Broadcasting Diversification," Japan Ministry of Posts & Telecommunications, Mar. 1982, 114 pages.

"Westar and Videotoken Network Present the TableComputer", revised Aug. 15, 1985, 41 pages.

Antonof, "Stay Tuned for Smart TV," Popular Science, Nov. 1990, pp. 62-65.

Author unknown, "Facsimile Transmission," NHK Research Monthly Report, Dec. 1987, 78 pages.

Baer, R.H., "Innovative Add-On TV Products," IEEE Transactions on Consumer Electronics, vol. CE-25, Nov. 1979, pp. 765-771.

Bensch, "VPV Videotext Programs Videorecorder," IEE Paper, Jun. 1988, pp. 788-792.

Bestler, "Flexible Data Structure and Interface Rituals for Rapid Development of OSD Applications," 42nd Annual Convention and Exposition of the NCTA, Jun. 6, 1993, San Francisco, CA, p. 223-236.

Brugliera, Vito,"Digital On-Screen Display—A New Technology for the Consumer Interface," Symposium Record Cable Sessions of the 18th International Television Symposium & Technical Exhibition, Jun. 1993, pp. 571-586.

Buehl, J., "Navigation Service Requirements for Advanced Television," printed from the Internet at http://www.pioneerdigital.com/papers/navig.htm on May 5, 1999, 18 pages.

CableComputer User's Guide, bearing a date of Dec. 1985, 4 pages.

CableData, Roseville Consumer Presentation, Mar. 1986, 12 pages.

CableVision Advertisement for "TV Decisions," Aug. 1986, 3 pages.

Carne, E.B., "The Wired Household," IEEE Spectrum, Oct. 1979, pp. 61-66.

Case 4:11-cv-06591-PJH, Complaint for Declaratory Relief (plaintiff), dated Dec. 21, 2011, 16 pages.

Chan, Patrick, P., "Learning Considerations in User Interface Design: The Room Model," publication of the Software Portability Laboratory, University of Waterloo, Waterloo, Ontario, Canada, Jul. 1984, 52 pages.

Chirstodoulakis et al., "Browsing Within Time-Driven Multimedia Documents," publication of the Institute for Computer Research, University of Waterloo, Waterloo, Ontario, Canada, Jul. 1988, pp. 219-227.

Daily, Mack, "Addressable Decoder with Downloadable Operation," Proceedings from the 42nd Annual Convention and Exposition of the NCTA, Jun. 6-9, 1993, pp. 82-89.

Damouny, N.G., "Telextext Decoders—Keeping Up With the Latest Advances," IEEE Transactions on Consumer Electroncis, vol. CE-30, No. 3, Aug. 1984, pp. 429-435.

Davis, TV Guide on Screen, "Violence on Television," House of Representatives, Committee on Energy and Commerce, Subcommittee on Telecommunications and Finance, pp. 93-163, Jun. 25, 1993.

Dinwiddie et al., "Combined-User Interface for Computers, Television, Video Recorders, and Telephone, etc.," IBM Technical Disclosure Bulletin, vol. 33, No. 3B, Aug. 1990, pp. 116-118.

Edwardson et al., "CEEFAX: A Proposed New Broadcasting Ser.," Journal of the SMPTE, Jul. 1974, pp. 14-19.

Hartwig, "Softwarearchitekturen für interaktive digitale Decoder," Fernseh-und Kino-Technik, 50(3):92-94, 96-98, 100-102 (Mar. 1996). No English Translation.

Hedger, J., "Telesoftware: Home Computing Via Broadcast Teletext," IEE Transactions on Consumer Electronics, vol. CE-25, No. 3, Jul. 1979, pp. 279-287.

Hirodata et al., "Impact: An Interactive Natural-Motion-Picture Dedicated Multimedia Authoring System," Communications of the ACM, Mar. 1991, pp. 343-350.

(56) References Cited

OTHER PUBLICATIONS

Hirtz et al., "OpenTV: Betriebssystem fur interaktives Fernsehen," Fernseh- Und Kino-Technik, 50, Jahrgan Nr. Mar. 1996 (1996), 15 pages.

Hitachi Consumer Electronics Co., Ltd., Certification of market introduction in 1993 of Hitachi Projection TV Model 55EX7K, Dec. 17, 2012, 1 page.

Hitachi Projection Color TV Operating Guide, for Models 55EX7K, 50EX6K, 50ES1B/K, and 46EX3B/4K, 38 pages, undated.

Hitachi Service Manual, No. 0021, Projection Color Television, Models 55EX7K, 50EX6K, 50ES1B/K, 46EX3B/4K, and 46EX3BS/4KS, Aug. 1993, 1 page.

Hoarty, W. Leo, "Multimedia on Cable Television Systems," Symposium Record Cable TV Sessions, 18th International Television Symposium and Technical Exhibition, Montreux, Switzerland, Jun. 10-15, 1993, pp. 555-567.

Hoffman et al., "Videotext Programmiert Videorecorder," Rundfunktech Mitteilungen, Broadcast Engineering Reports, vol. 26, Nov.-Dec. 1982, 14 pages.

Ishii Hiroshi et al., "Clearface: Translucent Multiuser Interface for TeamWorkStation," ECSCW, Sep. 1991, pp. 6-10.

Ishii Hiroshi et al., "Toward an Open Shared Workspace: Computer and Video Fusion Approach of TeamWorkStation," Communications of the ACM, Vo. 34, No. 12, Dec. 1991, pp. 37-50.

James, A., "Oracle—Broadcasting the Written Word," Wireless World, Jul. 1973, pp. 314-316.

Japan Mechanical Engineering Organization Int'l Society for the Advancement of Image Software, "Technological Examination & Basic Investigative Research Report on Image Databases," Japan, Mar. 1988, 127 pages.

Jerrold Communications Publication, "Cable Television Equipment," dated 1992 and 1993, pp. 8-2.1 to 8-6 and 8-14.1 to 8-14.3.

Judice, C.N., "Move Over Cable, Here Comes Video Via Voice Lines," Network World, Sep. 1986, p. 26.

JVC Service Manual, 27" Color Monitor/Receiver, Model AV-2771S (U.S.), Jul. 1991, 89 pages.

Karstad, K., "Microprocessor Control for Color-TV Receivers," IEEE Transactions on Consumer Electronics, vol. CE-26, May 1980, pp. 149-155.

Leftwich, Jim and Steve Schein. Appendix B: Starsight Interactive Television Guide, Phase III. Palo Alto: Apr. 11, 1997, 36 pages.

Letter from Mr. Gerald Knapp of CableData to Rodney A. Hansen of Weststar Communications, Inc., bearing a date of Mar. 19, 1985, 6 pages.

Listing of computer code for operating system within the Cable Computer in 1985, 97 pages.

Listing of computer code for Video HTU Program, 1 page.

Lowenstein et al., "Technology Review," vol. 88, Oct. 1985, p. 22.

M/A-COM, Inc., Videocipher II Satellite Descrambler Owner's Manual, dated prior to Feb. 1986, 20 pages.

Mannes, G., "Smart Screens; Development of Personal Navigation Systems for TV Viewers," Video Magazine, Dec. 1993, 6 pages.

McKenzie, G.A., "Oracle—An Information Broadcasting Service Using Data Transmission in the Vertical Interval," Journal of the SMPTE, Jan. 1974, pp. 6-10.

Merrell, "Tac Timer," 1986 NCTA Technical Papers, pp. 203-206.

Michael Alexander, "Visualizing cleared-off desktops," Computerworld, May 6, 1991, p. 20.

Prevue Guide Brochure, Spring 1994, 22 pages.

Rath et al., "Set-Top Box Control Software: A Key Component in Digital Video," Philips J., Res. 50, 185-199 (1996).

Rayers, D.J., "Telesoftware by Teletext," 1984 IEEE Conf. Papers, vol. 240, p. 323.

Roizen, Joseph, "Teletext in the USA," Society of Motion Picture and Television Engineers Journal, Jul. 1981, pp. 602-610.

Roseville City Council Presentation, bearing a date of Mar. 13, 1985, 12 pages.

Schlender, "Couch Potatoes! Now Its Smart TV," Fortune, No. 20, 1989, pp. 111-116.

Sealfon, Peggy, "High Tech TV," Photographic, Dec. 1984, 2 pages.

Starsight CB1500 customer letter, "Getting Started" Installation Guide, "Using Starsight" Manual, and Remote Control "Quick Reference Guide," 1994, 1 page.

Sunada et al., "Teletext Color Television Receiver Model C-29M950, C26M940," NEC Home Electroncis, NEC Giho, 1987, 16 pages.

Tech Notes: Product Updates from M/A-COM Cable Home Group, "Videocipher Owners Manual Update," Issue No. 6, Feb. 1986, 24 pages.

Transcript of the Deposition of John Roop, Oct. 1996, pp. 186-187.

Trial Testimony of Mr. Michael F. Axford, Reporters Transcript of Proceedings Held on May 9, 1998 for Prevue Interactive, Inc. and United Video Satellite Group, Inc. vs. Starsight Telesight, Inc., pp. 186-187, 296-315, and 352-357.

Uniden, UST-4800 Super, Integrated Receiver/Descrambler, Preliminary Reference Manual, Nov. 12, 1991, 80 pages.

Uniden, UST-4800, Integrated Receiver/Descrambler, Installation Guide, © 1990, Uniden America Corporation, 60 pages.

Uniden, UST-4800, Integrated Receiver/Descrambler, Operating Guide, © 1990, Uniden America Corporation, 24 pages.

Various publications of Insight Telecast, 1992 and 1993, 10 pages.

Veith, R.H., "Television's Teletext," Elsevier Science Publishing Co., Inc., 1983, pp. 13-20, 41-51.

Videocipher Stipulation, May 1996, 5 pages.

VTN "Videotoken Network, New Dimension Television," Rev. 1, Dec. 1985, 10 pages.

Williams, T., "STB operating systems gear up for flood of data services," Computer Design, 67-80 (Feb. 1996).

\* cited by examiner

INTERACTIVE TELEVISION SYSTEM WITH PROGRAMMING-RELATED LINKS

CROSS-REFERENCE TO RELATED APPLICATIONS

This application is a continuation of U.S. patent application Ser. No. 11/894,642, filed Aug. 20, 2007 (now allowed), which is a continuation of U.S. patent application Ser. No. 10/923,265, filed Aug. 20, 2004 (now abandoned), which is a continuation of U.S. patent application Ser. No. 09/699,207, filed Oct. 27, 2000 (now abandoned), which claims the benefit of U.S. Provisional Application No. 60/162,484, filed Oct. 29, 1999, and U.S. Provisional Application No. 60/165,610, filed Nov. 15, 1999. All of these prior patent applications are hereby incorporated by reference herein.

BACKGROUND OF THE INVENTION

This invention relates to interactive television systems such as interactive television program guide systems, and more particularly, to linking techniques in interactive television systems.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guide are typically implemented on set-top boxes. Such program guides allow users to view television program listings in different display formats. For example, a user may instruct the program guide to display a grid of program listings organized in a channel-ordered or a time-ordered list. Users may also search and sort program listings by theme (e.g., movies, sports, etc.) or by title (i.e., alphabetically). The user may purchase a pay program from the program guide by placing the highlight region on a program listing and pressing an "OK" key. Some systems allow the user to select a program for recording by placing the highlight region on a program listing and pressing a "record" key.

It is an object of the present invention to provide an interactive television system that supports programming-related links between various applications.

SUMMARY OF THE INVENTION

This and other objects of the invention are accomplished in accordance with the principles of the present invention by providing an interactive television system that supports programming-related links. Programming-related links may be provided in non-program-guide applications.

An interactive television program guide application and anon-program-guide interactive television application (i.e., an application involving non-program-guide resources) may be implemented on user television equipment. The non-program-guide application may display screens that include information that is related to programming. For example, the non-program-guide application may display screens that are related to a television program, a television series, a television channel or network, a package of television programming, etc. The programming-related information may be an advertisement, graphic, word, phrase, etc. The system may provide a user with an opportunity to select the programming-related information that is displayed. When the user selects the information, an overlay or a display screen may be displayed that is related to the selected information. The overlay or display screen may be displayed by the program guide application. The display screen or overlay that is displayed when the information is selected may vary based on attributes of the programming to which the selected information is related.

The display screen or overlay may include a graphic that is related to the programming, a description of the programming, a video that is related to the programming, programming-related options for accessing program guide application features, advertisements, program listings, etc. If desired, an advertisement that is related to the programming may be displayed.

A database of programming information such as a program guide database may be accessed to determine which programming in the user's service area (if any) is related to information that has been selected from a non-program-guide display screen.

Information may be selected by, for example, positioning a highlight region on the information of interest and pressing an enter or select or OK key or an information key. An on-screen indicator may be associated with displayed information to indicate to a user that the information is related to programming. If desired, a display screen or overlay for related programming may be displayed when the indicator is selected. A user may be provided with an opportunity to exit a programming-related display screen or overlay to allow the user to return to an initiating non-program-guide display screen.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
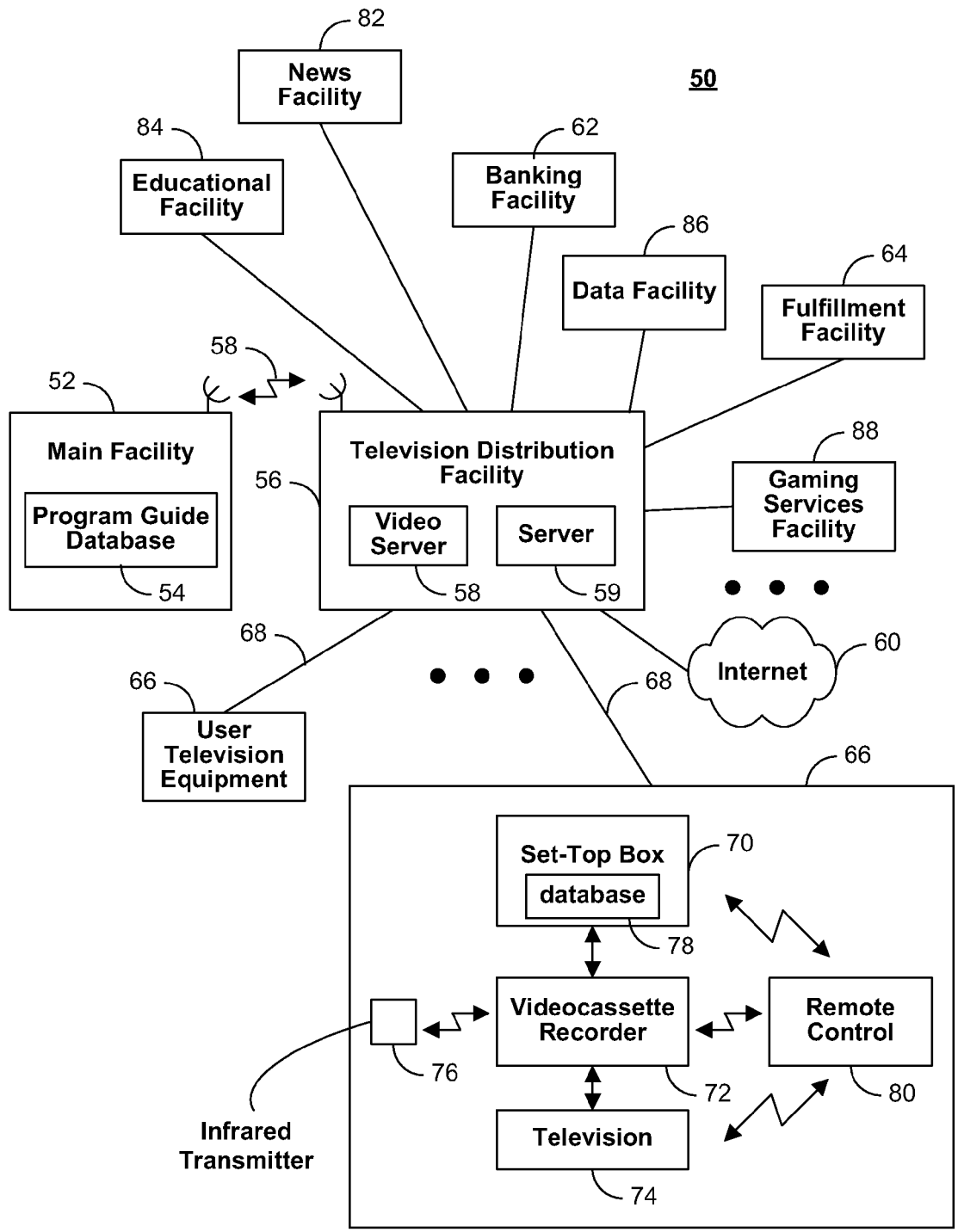
FIG. 1 is a diagram of an illustrative interactive television system in accordance with the present invention.

An illustrative interactive television system 50 in accordance with the present invention is shown in FIG. 1. Main facility 52 may contain a database 54 for storing program guide information such as television program guide listings data, pay-per-view ordering information, television program promotional information, etc.

Information from database 54 may be transmitted to television distribution facilities 56 via communications path 58. Only one television distribution facility 56 is illustrated in FIG. 1 to avoid over complicating the drawings. For clarity, the invention will be primarily discussed in connection with the use of one such television distribution facility.

Television distribution facility 56 is a facility for distributing television signals to users, such as a cable system headed, a broadcast distribution facility, or a satellite television distribution facility. Path 58 may be a satellite communications path, a telephone network communications path, an Internet communications path, a cable or fiber optic communications path, a microwave communications path, a combination of such communications paths, or any other suitable communications path.

Information transmitted by main facility 52 to television distribution facility 56 includes television program listings data such as program times, channels, titles, descriptions, etc. Transmitted program information also includes pay program data such as pricing information for individual programs and subscription channels, time windows for ordering programs and channels, telephone numbers for placing orders that cannot be impulse ordered, etc. Information transmitted by main facility 52 to television distribution facility 56 may include advertising information, such as text, graphics, video advertisements, and scheduling information. If desired, some of the program guide and advertising information may be provided using data sources at facilities other than main facility 52. For example, data related to pay program order processing (e.g., billing data and the like) may be generated by an order processing and billing system that is separate from main facility 52 and separate from television distribution facility 56. Similarly, advertising information may be generated by an advertising facility that is separate from main facility 52 and television distribution facility 56.

Television distribution facility 56 distributes program guide and advertising information to user television equipment 66 for multiple users via communications paths 68 which may carry analog signals, digital signals, or both. User television equipment 66 may be any suitable equipment or device for providing television to a user that contains sufficient processing capabilities to implement an interactive television program guide. Paths 68 may be cable paths, fiber-optic paths, satellite paths, broadcast paths, or other suitable paths or a combination of such paths. Any suitable analog, digital, or analog and digital communications scheme may be used to transmit data over paths 68, including in-band transmissions (e.g., vertical blinking interval), out-of-band transmissions, digital transmissions, analog transmissions, cable transmissions, satellite transmissions, cable modem transmissions, over-the-air transmissions, multichannel multipoint distribution services (MMDS) transmissions, etc.

Data may be distributed continuously, periodically, on-demand, or in a combination thereof. Paths 68 may be bidirectional, so that functions such as impulse pay-per-view purchases from the program guide and client-server functions may be supported. When services other than program guide services are provided to the user, data may be provided over paths 68 that relates to such non-program-guide services.

Advertising information may be distributed using any of a number of suitable techniques. For example, text and graphics advertisements may be distributed over an out-of-band channel using an out-of-band modulator. Video advertisements may also be distributed in this way, although large quantities of video information may be more efficiently distributed using one or more digital channels or data streams on path 68. Such digital channels or data streams may also be used for distributing text and graphics.

Each user television equipment has a receiver, which may be set-top box 70, but which may be other suitable television equipment such as an advanced television receiver into which circuitry similar to set-top-box circuitry has been integrated, a personal computer television (PC/TV), or a personal computer (e.g., with a television tuner cord). An interactive television program guide or various non-program-guide applications may be implemented on user television equipment such as set-top box 70. If desired, interactive television applications (e.g., program guide applications and non-program-guide applications) may be implemented partially on user television equipment and partially at a television distribution facility. For example, server 59 at television distribution facility 56 and set-top box 70 at user television equipment may be arranged in a client-server architecture for supporting program guide or non-program-guide applications. If desired, server 59 may be at a different location (e.g., an intermediate node). Data, such as program guide data, may be distributed by server 59 to user television equipment. Data may have been provided to television distribution facility 56 from different facilities with a communications path respective to each facility. For example, program guide data at database 54 of facility 52 may be distributed to television distribution facility 56 via communications path 58.

If desired, an interactive television program guide may be implemented using a data-relay architecture. In such an architecture, television distribution facility 56 may serve as a data-relay site and user television equipment 66 may be a data destination site. For example, television distribution facility 56 may continuously or periodically distribute information as the information is received. In a data-relay architecture, a program guide implemented on user television equipment 66 may use a database (e.g., database 78) for storing program guide and advertising information at user television equipment 66. Program guide information may include program listings and program attributes. Advertising information may include interactive advertisements and scheduling information.

Television distribution facility 70 may also poll set-top boxes 70 periodically for certain information (e.g., pay program account information or information regarding programs that have been purchased and viewed using locally-generated authorization techniques). For clarity, the present invention is described primarily in the context of program guide and non-program-guide applications that are implemented entirely on user television equipment that is a set-top box.

Each set-top box 70 preferably contains a processor to handle tasks associated with implementing a program guide application or other interactive television application such as a home shopping application, a web browser application, a home banking application, or video-on-demand application, a chat application, an e-mail application, etc., on the set-top box 70. For clarity, the present invention will be described primarily in the context of interactive television program guide applications, but the invention also applies to other interactive television applications. Moreover, different configurations may be used for distributing data to user television equipment 66 such as configurations in which program listings and other information may be distributed to user television equipment 66 without passing through television distribution facility 56 using paths that are separate from communications paths 68. For clarity, the present invention will be described primarily in connection with the illustrative data distribution arrangement shown in FIG. 1. Television distribution facility 56 may contain a processor (e.g., server 59) for handling tasks associated with the distribution of program guide and advertising information.

Each set-top box 70 is typically connected to an optional videocassette recorder 72 so that selected television programs may be recorded. Each videocassette recorder 72 is connected to a television 74 or other viewing device. To record a program, set-top box 70 tunes to a particular channel and sends control signals to videocassette recorder 72 (e.g., using infrared transmitter 76) that directs videocassette recorder 72 to start and stop recording at the appropriate times. If desired, any suitable recording device may be used, including digital video recorders, a digital video disk (DVD) player with recording capabilities, hard disk, etc.

During use of the interactive television program guide implemented on set-top box 70, television program listings may be displayed on television 74 or other suitable monitor. Each set-top box 70, videocassette recorder 72, and television 74 may be controlled by one or more remote controls 80 or any other suitable user input interface such as a wireless keyboard, mouse, trackball, dedicated set of keys, touch screen display remote, etc. For clarity, the present invention is described primarily in the context of an interactive television system in which the user input interface device is a remote control. A typical remote control has arrow keys for controlling the position of a highlight region in a display screen and a select key, such as an OK, ENTER, or ACCEPT key. The remote control may also have other remote control keys such as an information "INFO" key, an record key, channel up or down keys, volume control keys, numeric keys, etc. By moving the highlight region on an item of interest and pressing a select key, a user may select information, options, listings, etc.

Communications paths 68 preferably have sufficient bandwidth to allow television distribution facility 56 to distribute scheduled television programming, pay programming, advertising and other promotional videos, and other video information to set-top boxes 70 in addition to non-video program guide and advertising data. Multiple television and audio channels (analog, digital, or both analog and digital) may be provided to set-top boxes 70 via communications paths 68.

Television distribution facility 36 may contain a video server 58 to support video-on-demand applications. With such applications, videos that are stored on video server 58 may be requested by users at user television equipment 66. The videos may then be played back to the users over communications paths 68. Server 59 may be separate from or integrated with server 58

Certain functions such as pay program purchasing may require set-top boxes 70 to transmit data to television distribution facility 56 over communications paths 68. If desired, such data may be transmitted over telephone lines or other separate communications paths. If functions such as these are provided using facilities separate from television distribution facility 56, some of the communications involving set-top boxes 70 may be made directly with the separate facilities.

Users may interactively order additional information, products, or services. Such orders may be satisfied by fulfillment facilities (e.g., fulfillment facility 64). If desired, orders may be transmitted directly to fulfillment facilities via communications paths which may be telephone paths, the Internet, or other suitable communications paths. Orders may also be transmitted to television distribution facility 56 via paths 68, where the billing system of the television distribution facility may be used. After the television distribution facility 56 has processed the user's order, television distribution facility 56 may transmit the order to a fulfillment facility.

A web browser application implemented on set-top box 70 may allow the user to access the Internet 60. The Internet 60 may be either accessed directly (e.g., via a modem link) or via television distribution facility 56 (using, e.g., a cable modem link), as shown in FIG. 1. Other facilities and services that may be accessed directly or via television distribution facility 56 include banking services (using banking facility 62), shopping services (using fulfillment facility 64), wagering or gaming services (using gaming facility 88), interactive television services (using news facility 82), educational services (using educational facility 84) and information and other services (using data facility 86).

Figure 2:
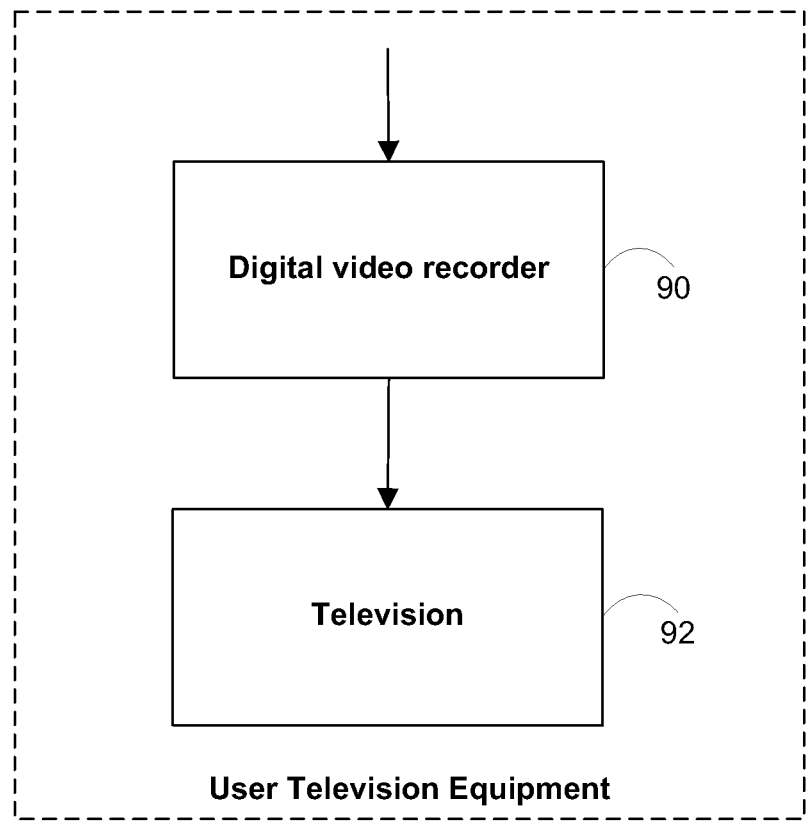
FIG. 2 is a diagram of an illustrative digital video recorder and television in accordance with the present invention.

As shown in FIG. 2, user television equipment may include a digital video recorder 90 that may receive control signals, video signals, or both from a set-top box (e.g., set-top box 70 of FIG. 1). Digital video recorder 90 may receive control signals from a user input interface, such as a remote control (e.g., remote control 80 of FIG. 1). Digital video recorder 90 may include a hard-disk drive or another digital storage medium that is used to store programming. The stored programming may be played by digital video recorder 90 and displayed on television 92.

Figure 3:
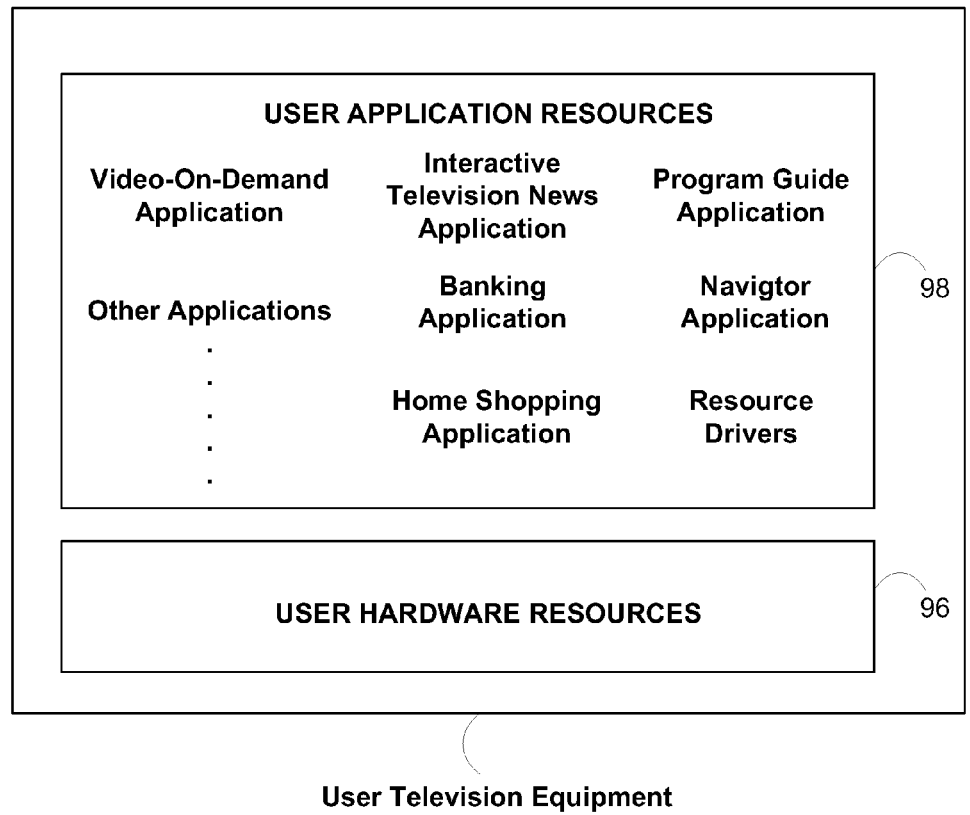
FIG. 3 is a diagram of an illustrative user television equipment in accordance with the present invention.

As shown in FIG. 3, user television equipment may include user hardware resources 96 (e.g., set-top box, television, video cassette recorder, etc.) and user application resources 98. User application resources 98 may include service-specific applications (e.g., a video-on-demand application, interactive television news application, banking application, home shopping application, etc.) and other applications (e.g., a navigator application, hardware resources driver application, operating system applications, etc.). The navigator application may be an application that provides users with an opportunity to invoke or switch between different service-specific applications.

User application resources may include an application program interface that provides a software interface for accessing features of one application from another application. For clarity, the present invention is described primarily in the context of a program guide application program interface that provides a software interface for accessing features of a program guide application from a non-program-guide application.

With an application program interface for a program guide application, non-program-guide applications may be developed to include access to program guide features. For example, interactive applications may be authored using a language, such as Java, ECMASCRIPT, etc. The authoring language may include some functions that are provided by a program guide developer to other developers. The input parameter(s) of these functions may include a channel number, call sign, network name (or other network identifier), channel name or (other channel identifier), program name (or other program identifier), program airing time, etc. The parameters may also include other means for identifying television programming. The code for a specific application may include these functions.

A specific non-program-guide application may be implemented on user television equipment by, for example, running the executable code for the specific application on the user television equipment. The specific application would then execute the program guide functions when such functions are used in the code for that application.

Figure 4:
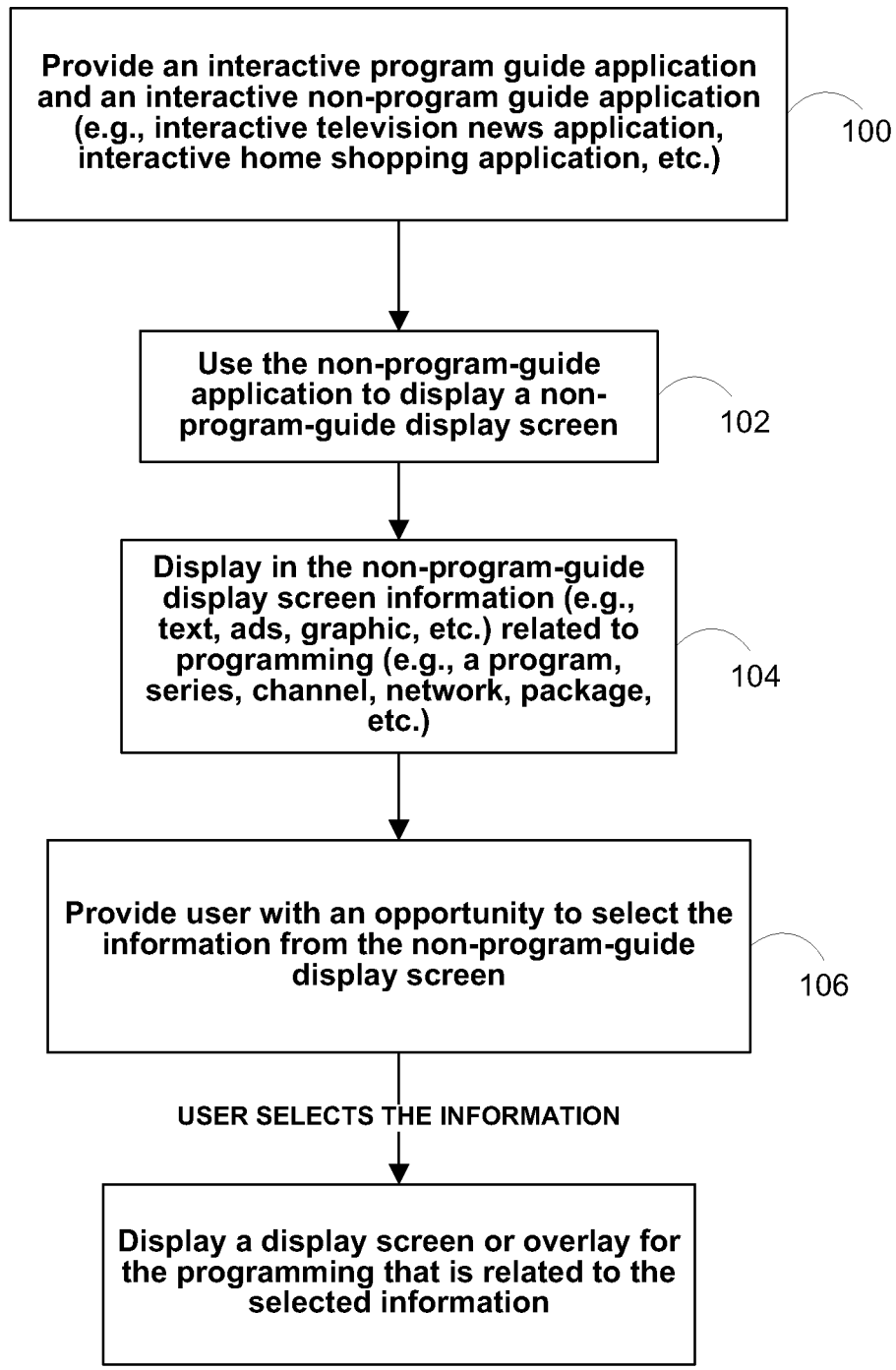
FIG. 4 is a flow chart of illustrative steps involved in displaying a display screen or overlay for programming that is related to information that was selected from a non-program-guide application in accordance with the present invention.

Illustrative steps involved in displaying a display screen or overlay for programming for use in an interactive television system, such as system 50 of FIG. 1, are shown in FIG. 4. At step 100, an interactive program guide application and an interactive non-program-guide application, such as an interactive television news application, interactive home shopping application, video-on-demand application, etc., may be provided. Each application may be at least partially implemented on user television equipment (e.g., set-top box 70 of FIG. 1). At step 102, the non-program-guide application may display a non-program-guide display screen to allow the user to interact with the non-program-guide application. At step 104, information, such as text, advertisements, graphics, etc., that is related to programming (e.g., a program, series, channel, network, package, etc.) may be displayed in the non-program-guide display screen. If desired, step 104 may be a substep of step 102. At step 106, the user may be provided with an opportunity to select the information from the non-program-guide display screen. If desired, step 106 may be a substep of step 104 or step 106.

At step 108, a display screen or overlay for a particular programming (e.g., a program, channel, network, package, etc.) that is related to the information may be displayed when the user selects the information from the non-program-guide display screen. If desired, the display screen or overlay for the particular programming may have been displayed by the program guide application (e.g., by the non-programming guide application calling a program guide function).

Figure 5:
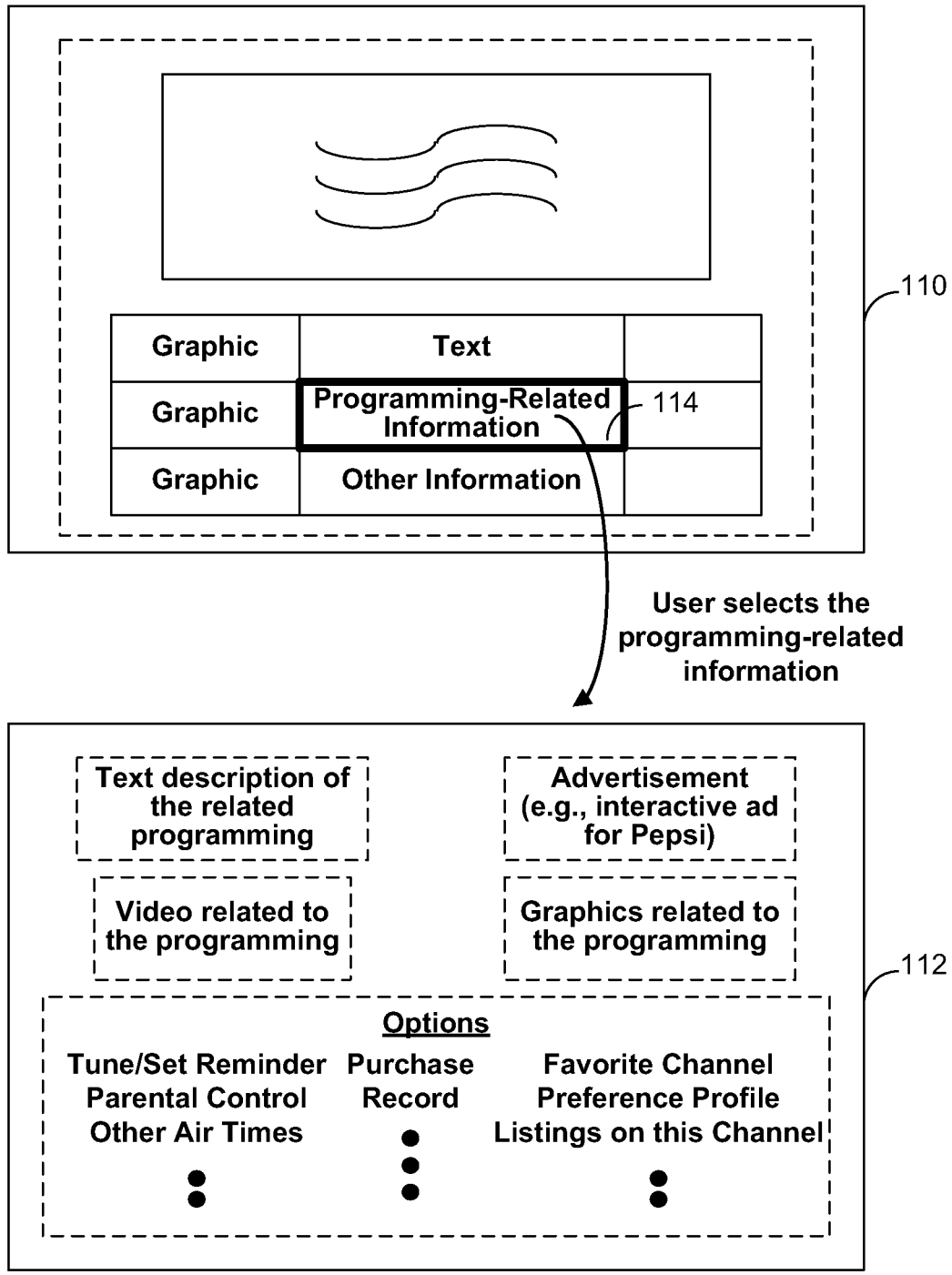
FIG. 5 is a diagram of an illustrative sequence of illustrative display screens that may be provided based on the illustrative steps of FIG. 4 in accordance with the present invention.

Illustrative non-program-guide display screen 110 and illustrative programming display screen 112 of FIG. 5 may be provided based on the illustrative steps of FIG. 4. Non-program-guide display screen 110 may include text, graphics, videos, options, etc., that may be intended for providing non-program-guide features and information to users. Non-program-guide display screen 110 may include information 114 having forms, such as text, video, graphic, advertisement, etc.

Information 114 may be related to a particular programming. Programming display screen 112 may be displayed when a user selects information 114 from non-program-guide display screen 110. Display screen 112 may include a text description of the particular programming item and video, graphics, and selectable options that are related to the particular programming item.

The options may include an option to watch the programming, an option to set a reminder or timer for the programming, an option to record the programming, an option to see additional air times for the programming, an option to purchase the programming or to view ordering instructions, an option to see listings of programs available on the programming (when the programming is a channel(s)), an option to add the programming or attributes of the programming to user preferences profiles, an option to add the programming to a favorite channel list (when the programming is a channel(s)), an option to parentally control the programming, or some aspect of the programming, etc.

If desired, the description, video, graphics, advertisement, options, or any combination thereof that is displayed for the related programming may have been displayed by an interactive television program guide application. For example, programming display screen 112 may be a program guide display screen (e.g., a display screen that is displayed by an interactive program guide application when the programming-related information 114 is selected from the non-program-guide display screen 110.)

Figure 6:
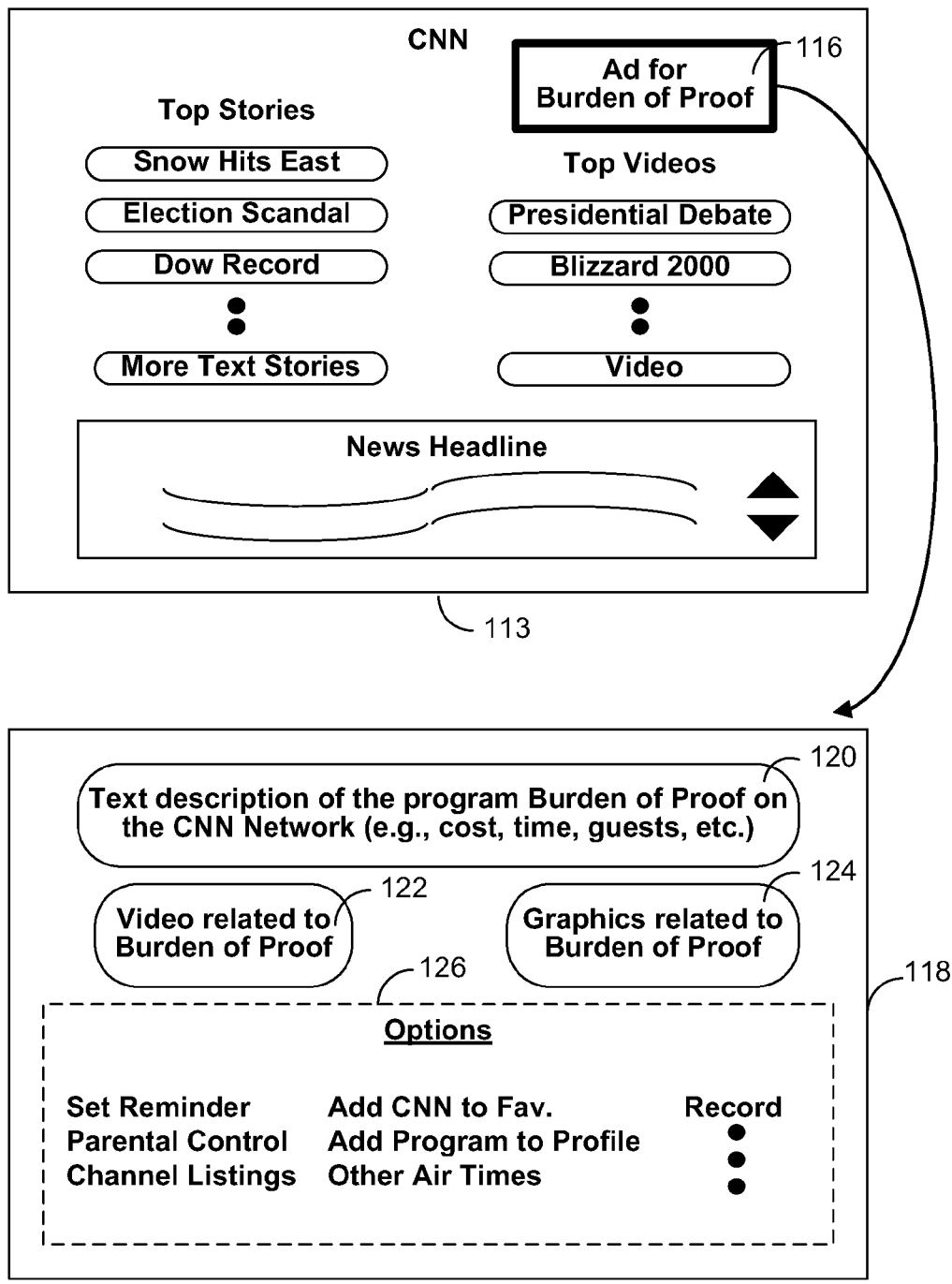
FIG. 6 is a diagram of an illustrative sequence of illustrative display screens that may be provided based on the illustrative steps of FIG. 4 in accordance with the present invention.

The programming-related information may be an advertisement. For example, illustrative interactive news application display screen 113 that includes an illustrative advertisement 116 and illustrative programming display screen 118 of FIG. 6 may be displayed based on the illustrative steps of FIG. 4. Interactive television news application display screen 113 may allow a user to interact with the interactive television news application. The provider of the application may be a news company such as CNN. Interactive advertisement 116 may be for the program Burden of Proof. Programming display screen 118 for Burden of Proof may be displayed when a user selects advertisement 116. Programming display screen 118 may include a text description 120 of the program Burden of Proof (e.g., cast, show time, guests, program content description, TV rating, duration, channel identifier, network identifier, etc.), video 122 related to the program Burden of Proof (e.g., a video clip of an upcoming episode), graphics 124 related to Burden of Proof (e.g., a logo for the network airing Burden of proof), and selectable options 126 (e.g., set reminder, parental control, profile, other air times, etc.)

Figure 7:
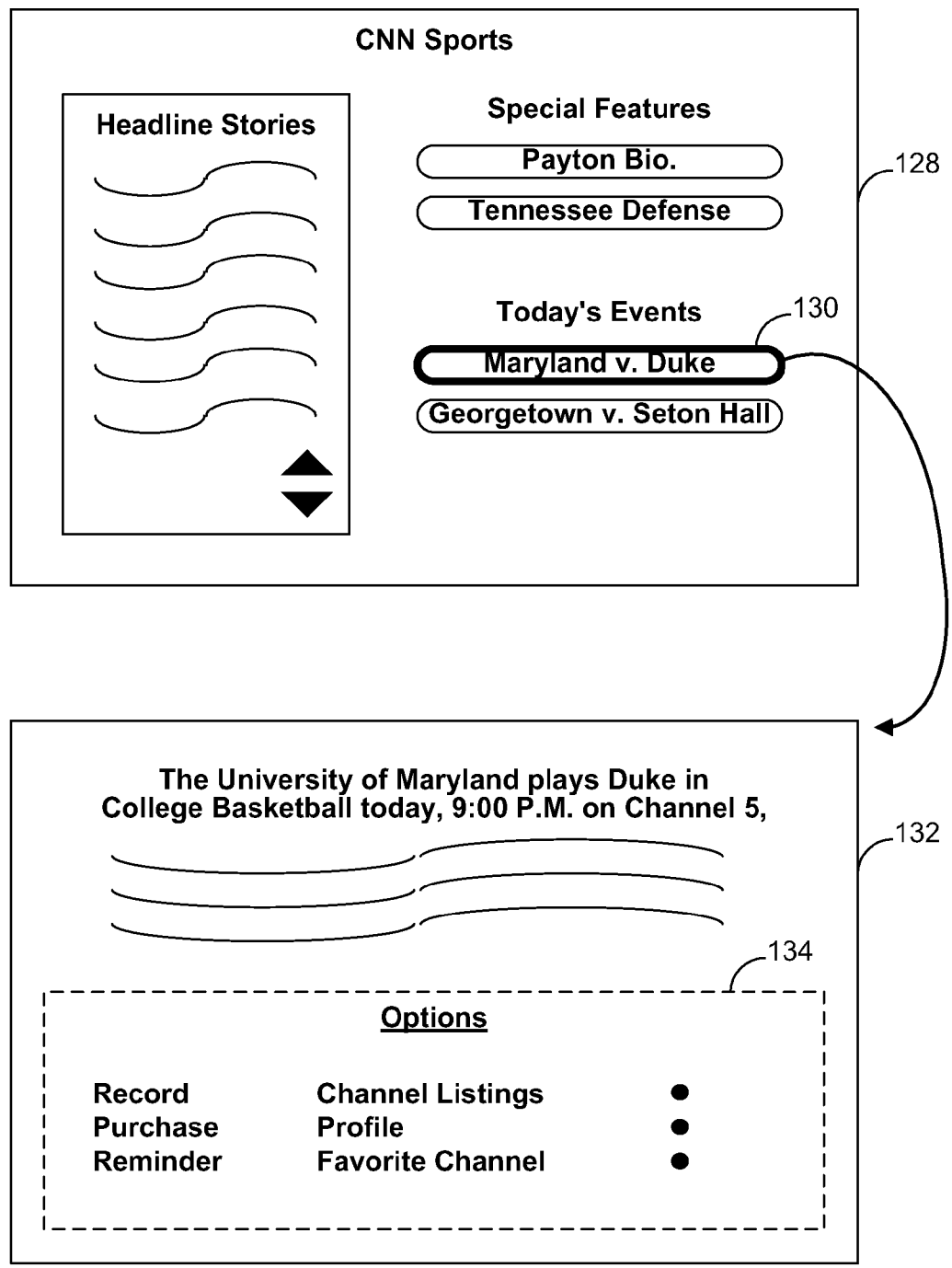
FIG. 7 is a diagram of an illustrative sequence of illustrative display screens that may be provided based on the illustrative steps of FIG. 4 in accordance with the present invention.

Illustrative sports news display screen 128 having a list a today's events and illustrative programming display screen 132 of FIG. 7 may be displayed based on the illustrative steps of FIG. 5. An interactive television news application may display sports news display screen 128. Sports news display screen 128 may include news-related options and information including a list of today's sports events in which the news application may list programming-related item 130 for the University of Maryland versus Duke University basketball game and the Georgetown Versus Seton Hall basketball game. Programming display screen 132 for the program airing the University of Maryland versus Duke University basketball game may be displayed when a user selects the Maryland versus Duke basketball game programming-related item 130. Information contained in programming display screen 132 may include a program description that includes program title, air time, duration, channel, network, team roster, team records, etc. Programming display screen 132 may further include program guide options 134 that are related to the program for the University of Maryland versus Duke University basketball game.

Figure 8:
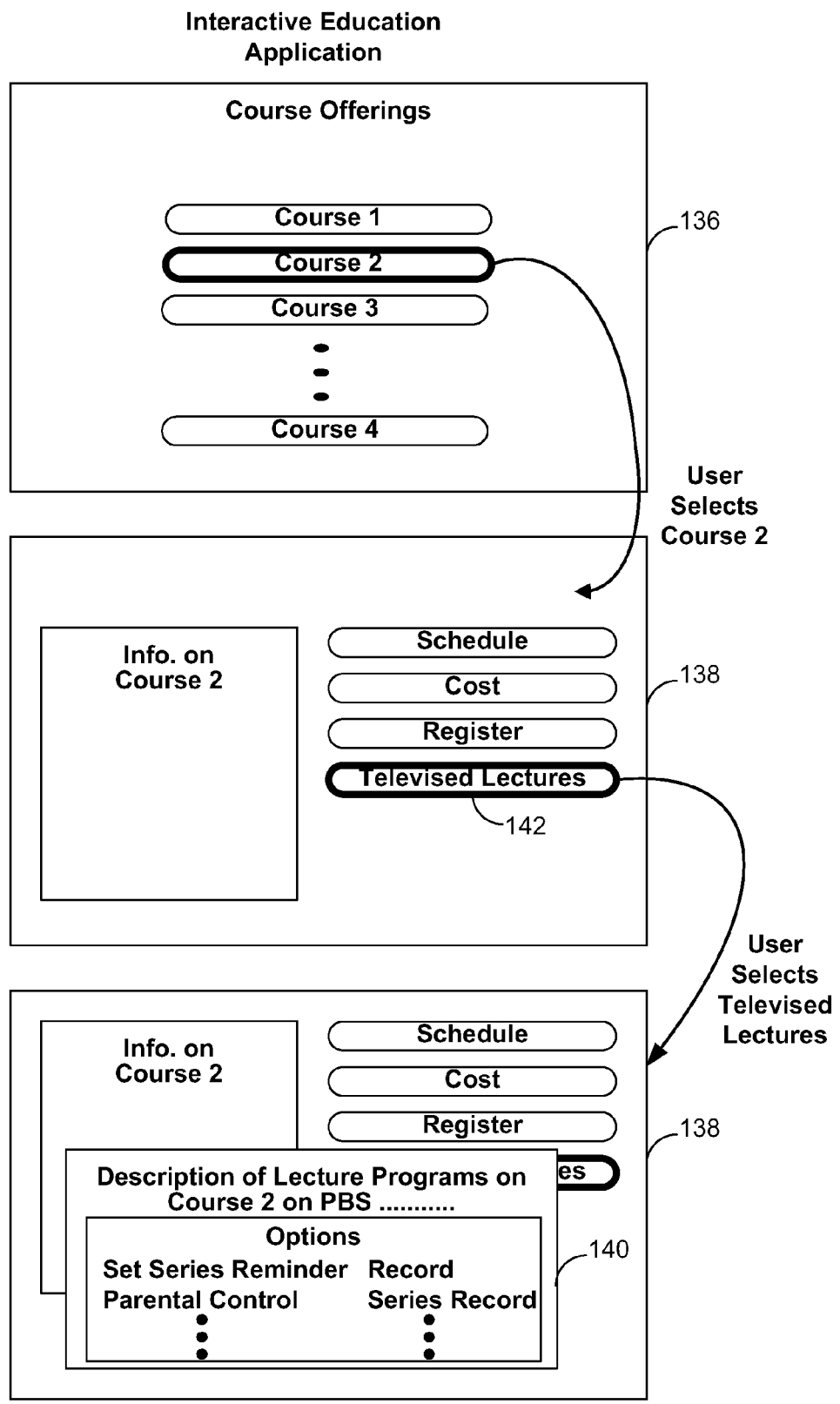
FIG. 8 is a diagram of an illustrative sequence of illustrative display screens that may be provided based on the illustrative steps of FIG. 4 in accordance with the present invention.

If desired, programming-related information and options may be displayed in an overlay. For example, illustrative course offerings display screen 136, illustrative course description display screen 138, and illustrative programming overlay 140 of FIG. 8 may be displayed based on the illustrative steps of FIG. 5. Course offering display screen 136 may include a list of course offerings. If desired, course offerings display screen 136 and course description display screen 138 may have been displayed by an interactive television education application. Course description display screen 138 may be displayed when a user selects a course (course #2) from course offerings display screen 136. Course description display screen 138 may include televised lectures option 142 for the selected course offering (course #2). Programming overlay 140 may be displayed in course description displays screen 138 when a user selects the televised lectures option 142. Overlay 140 may include a description of a series of televised lectures for the selected course (course 2) and may include programming-related options, such as a series reminder option or a series record option. If desired, overlay 140 may have been displayed by a program guide application. When a user selects an option, the appropriate program guide feature (e.g., parental control, reminder, profile, etc.) for that option may be invoked. For clarity and brevity, the present invention is primarily discussed in the context of display screens rather than in the context of both display screens and overlays.

Figure 9:
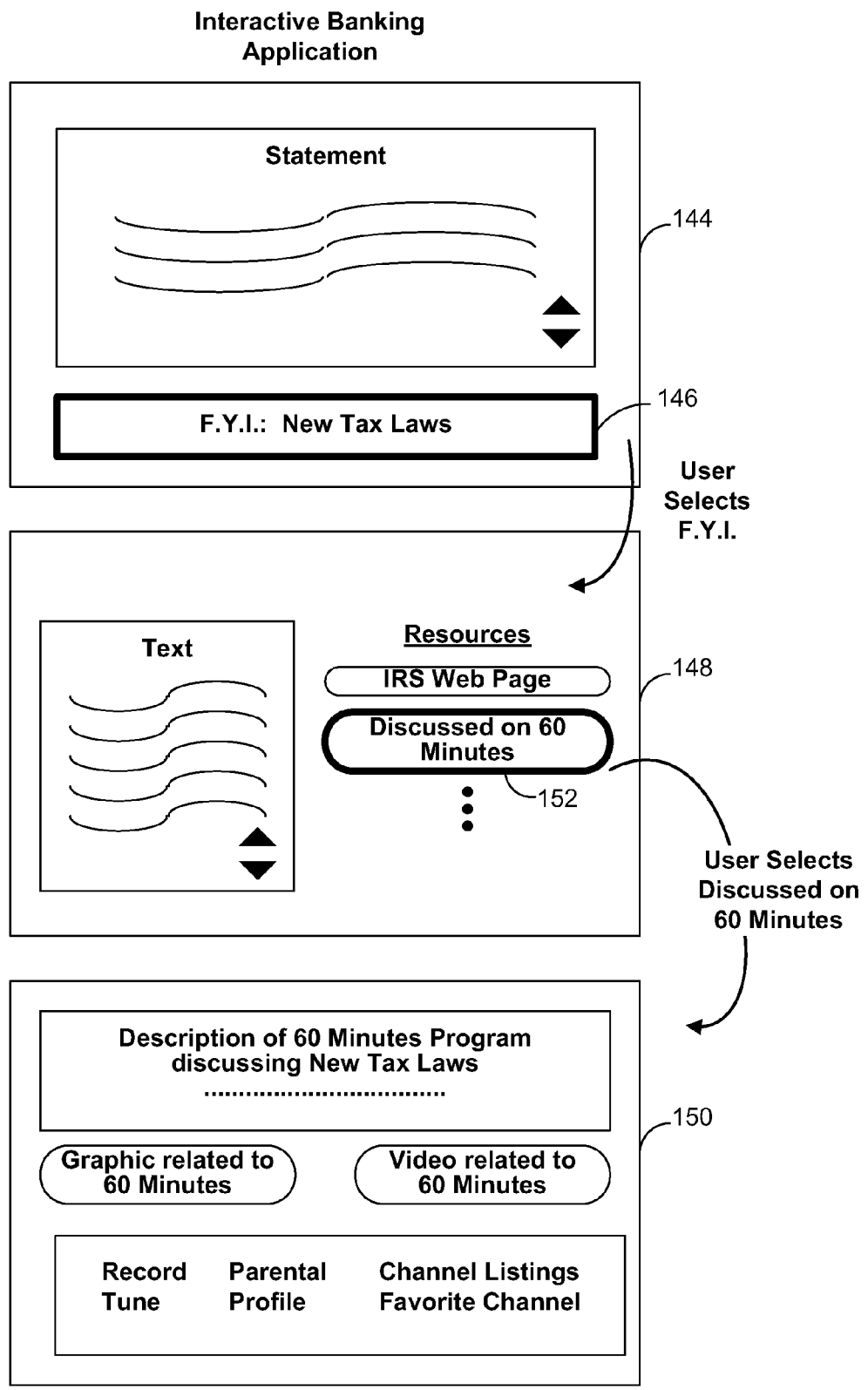
FIG. 9 is a diagram of an illustrative sequence of illustrative display screens that may be provided based on the illustrative steps of FIG. 4 in accordance with the present invention.

Information that is displayed in a non-program-guide application display screen may make reference to a particular program. For example, illustrative banking statement display screen 144, illustrative financial information display screen 148, and illustrative programming display screen 150 of FIG. 9 may be displayed based on the illustrative steps of FIG. 5. Illustrative banking statement display screen 144 may provide the user with an opportunity to interact with an interactive television banking application. Banking statement display screen 144 may include a selectable region 146 that is used to give notice to users of important financial information (e.g., F.Y.I.: New Tax Laws). Financial information display screen 148 may be displayed when a user selects region 146. Financial information display screen 148 may include text discussing the financial information, such as the new tax laws, and may include a list of resources. The list of resources may include programming related listing 152 "Discussed on 60 minutes." Programming display screen 150 may be displayed when programming related listing 152 is selected. Programming display screen 150 may include a description of the program referred to in the listing and program guide options. If desired, programming display screen 150 may include program-related video and graphics.

Information displayed in a non-program-guide application may be related to more than one user television equipment application resources. A non-program-guide application that displays the information may provide electronic links for these related resources. For example, illustrative display screen 152 and illustrative programming display screen 154 of FIG. 10 may be displayed based on the illustrative steps of FIG. 5. Display screen 152 may include a list of top stories including a top story for the presidential election. The listing for the presidential election may have link 156 for programming and link 158 for text news. Programming display screen 154 may be displayed when link 156 is selected. Programming display screen 154 may include a description of a program or programs on that topic and related program guide options. If desired, an advertisement may be included in programming display screen 154.

Figure 11:
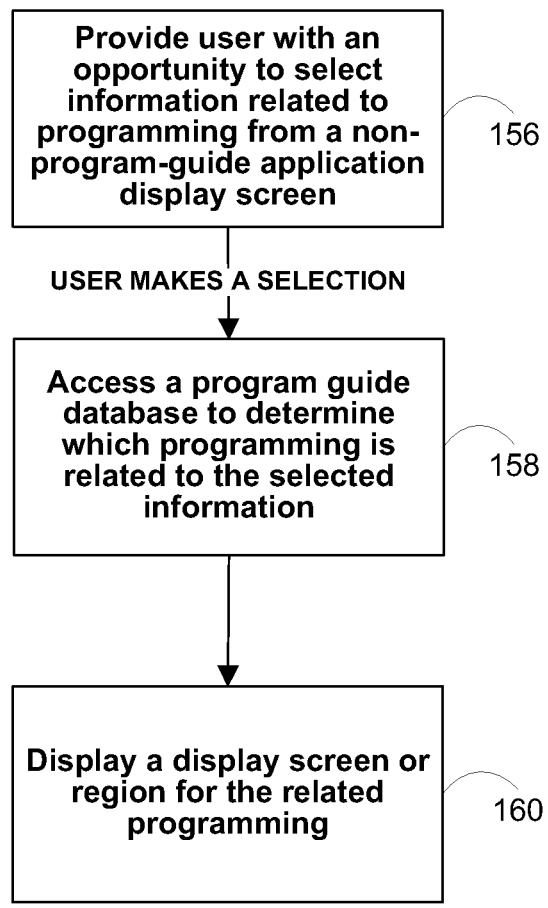
FIG. 11 is a flow chart of illustrative steps involved in determining for which programming to display a display screen or overlay based on selected information in accordance with the present invention.

Illustrative steps involved in displaying a display screen or overlay for programming that is related to user-selected information for use in an interactive television system, such as system 50 of FIG. 1, are shown in FIG. 11. At step 156, a user may be provided with an opportunity to select information that is related to programming from a non-program-guide application display screen. At step 158, a database of programming information that is stored for use by an interactive program guide application may be accessed to determine which programming (if any) is related to the selected information. At step 160, a display-screen or overlay for the related programming may be displayed. The content of the display screen or overlay that is displayed may vary based on attributes of the related programming.

Figure 12:
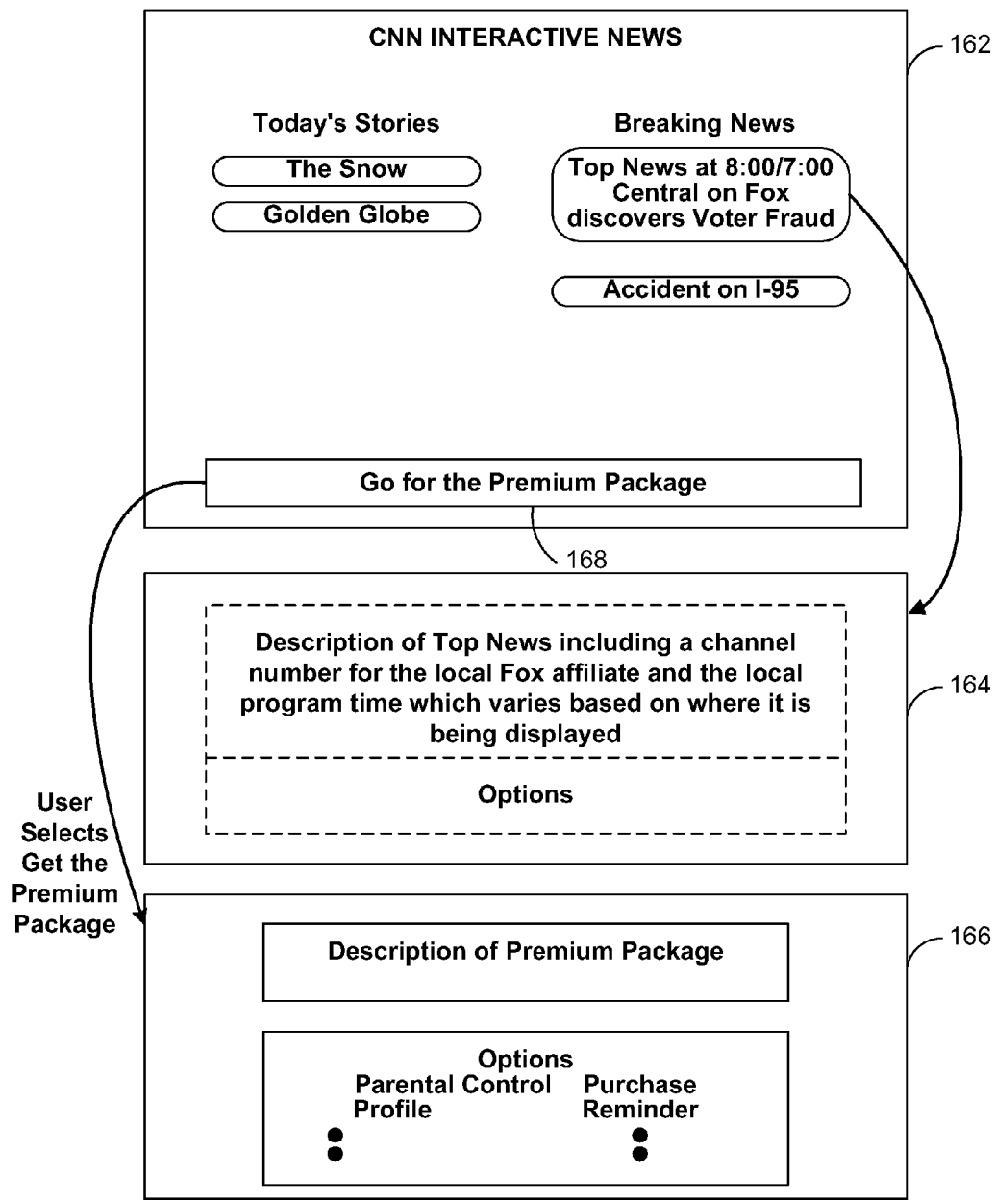
FIG. 12 is a diagram of illustrative sequences of illustrative display screens that may be provided based on the illustrative steps of FIG. 11 in accordance with the present invention.

Illustrative news display screen 162, illustrative program reminder display screen 164, and illustrative programming display screen 166 of FIG. 12 may be displayed based on the illustrative steps of FIG. 11. News display screen 162 may include information under the breaking news heading, such as "Channel 7, Eye Team News Discovers Voter Fraud." The program that may be related to the information may be a particular airing of a nightly daily news program (e.g., the nightly news on Channel 7 at 11:00 p.m. Program reminder display screen 164 may be displayed when the program-related information is selected from news display screen 162. Program reminder display screen 164 may provide the user with an opportunity to set a reminder for the program. A reminder display screen may have been displayed rather than, for example, an information display screen because the related program is a particular airing of a nightly news program.

News display screen 162 may include an advertisement 168 for a premium programming package. Programming display screen 166 may be displayed when advertisement 168 is selected. Programming display screen 166 may include a description of the premium package and options that are related to the premium package. Programming display screen 166 may have been determined for display based on attributes of the premium package.

Figure 13:
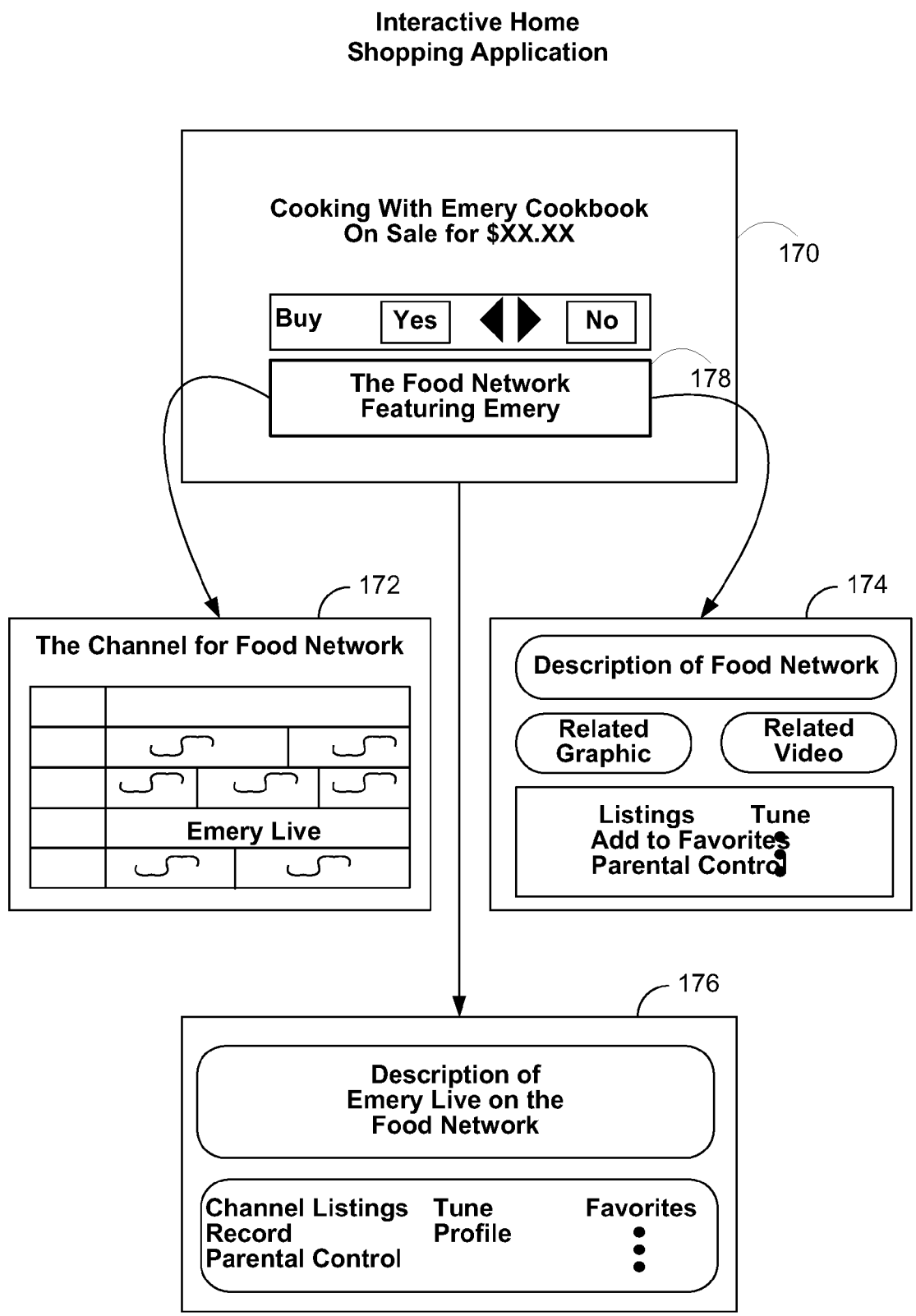
FIG. 13 is a diagram of illustrative sequences of illustrative display screens that may be provided based on the illustrative steps of FIG. 11 in accordance with the present invention.

The content of the display screen or overlay that is displayed may vary based on whether the related programming is determined to be an individual program, series, a pay-per-view program, channel, network, package, or a combination thereof. For example, illustrative home shopping display screen 170, illustrative program listings display screen 172, illustrative network display screen 174, and illustrative program display screen 176 of FIG. 13 may be displayed based on the illustrative steps of FIG. 11. Home shopping display screen 170 may include an advertisement 178. Advertisement 178 may be an advertisement for the Food Network Featuring Emery. Network display screen 174 may be displayed when advertisement 178 is selected and it is determined that the programming that is related to advertisement 178 is a network, the Food Network. Network display screen 174 may include a description of the network, related video, related graphic, and related options.

Program display screen 176 may be displayed when advertisement 178 is selected and it is determined that the programming that is related to advertisement 178 is an individual program, Emery Live. Program display screen 176 may include a description of the program and related options. Program listings display screen 172 may be displayed when advertisement 178 is selected and it is determined that the programming that is related to advertisement 178 is a channel or is a combination of a program and the channel that airs the program. Program listings display screen 172 may include current program listings for the related channel or program listings for the related channel in a time frame that includes the related program.

Figure 14:
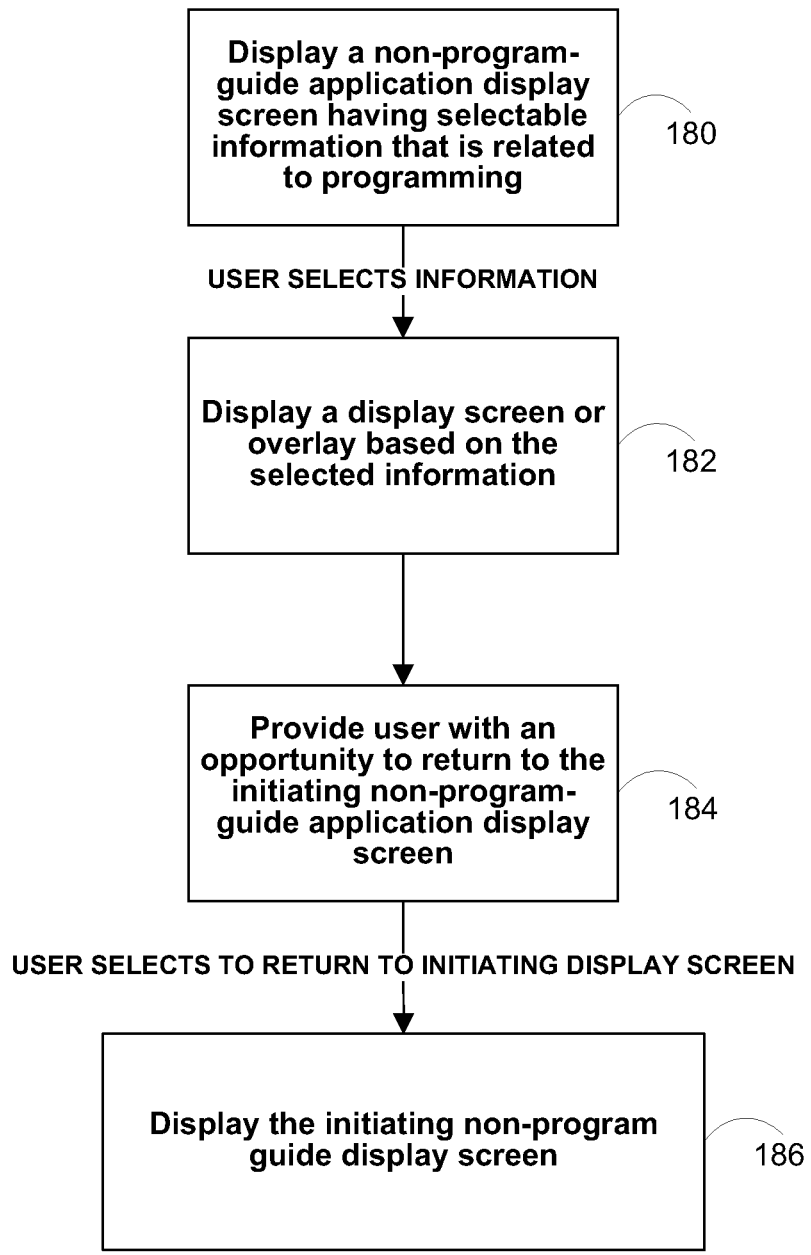
FIG. 14 is a flow chart of illustrative steps involved in returning a user to an initiating non-program-guide display screen in accordance with the present invention.

Illustrative steps involved in returning to a non-program-guide display screen for use in an interactive television system such as system 50 of FIG. 1, are shown in FIG. 14. At step 180, a display screen for a non-program-guide application is displayed that includes selectable information that is related to programming. At step 182, a display screen or overlay for the programming may be displayed when the related information is selected. At step 184, the user may be provided with an opportunity to return to the initiating display screen. At step 186, the initiating display screen may be displayed when the user selects to return to the initiating display screen.

Figure 15:
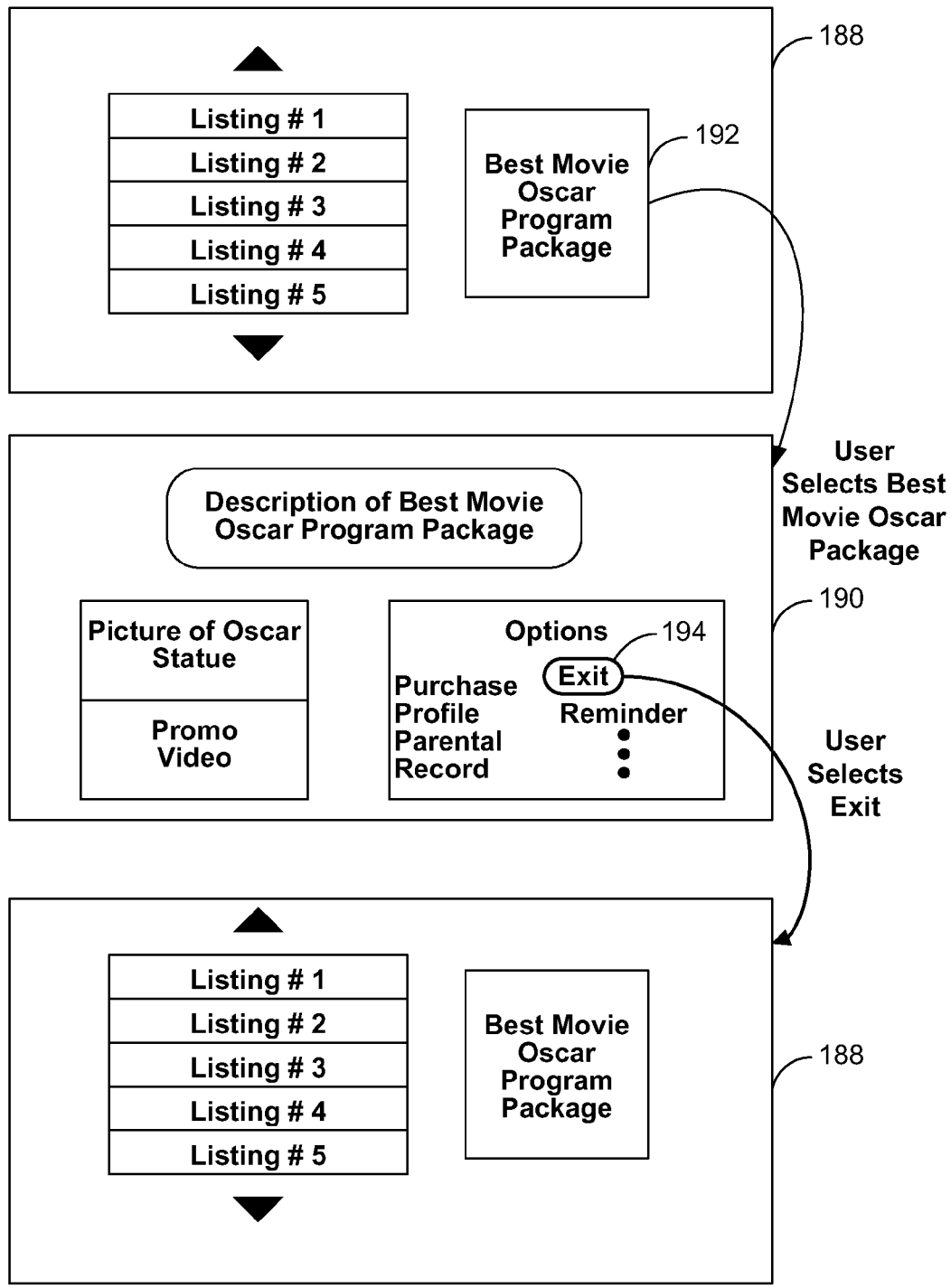
FIG. 15 is a diagram of illustrative sequence of illustrative display screens that may be provided based on the illustrative steps of FIG. 14 in accordance with the present invention.

Illustrative video-on-demand display screen 188, and illustrative-programming display screen 190 of FIG. 15 may be displayed based on the illustrative steps of FIG. 14. Programming display screen 190 may be displayed when best movie Oscar program package option 192 from video-on-demand display screen 188 is selected. Programming display screen 190 may include exit option 194 that when selected returns the user to the initiating display screen (video-on-demand display screen 188).

Figure 16:
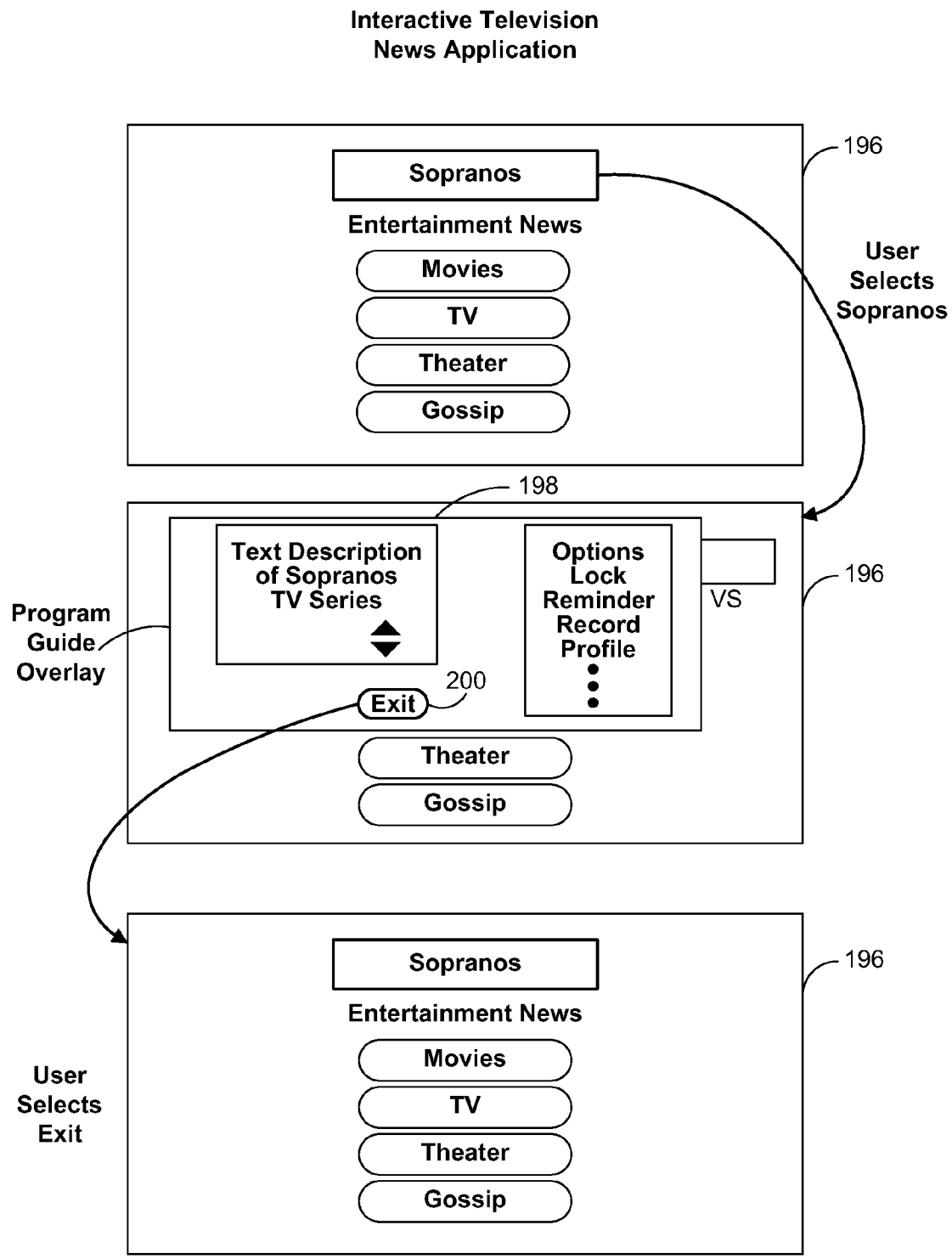
FIG. 16 is a diagram of an illustrative sequence of illustrative display screens that may be provided based on the illustrative steps of FIG. 14 in accordance with the present invention.

An exit option may be provided from an overlay. For example, illustrative entertainment news display screen 196 and illustrative overlay 198 of FIG. 16 may be displayed based on the illustrative steps of FIG. 14. Programming overlay 198 for the program series The Sopranos may be displayed when an advertisement for The Sopranos is selected from entertainment news display screen 196. Overlay 198 may include exit option 200 that when selected returns the user to the initiating display screen, entertainment news display screen 196.

Figure 17:
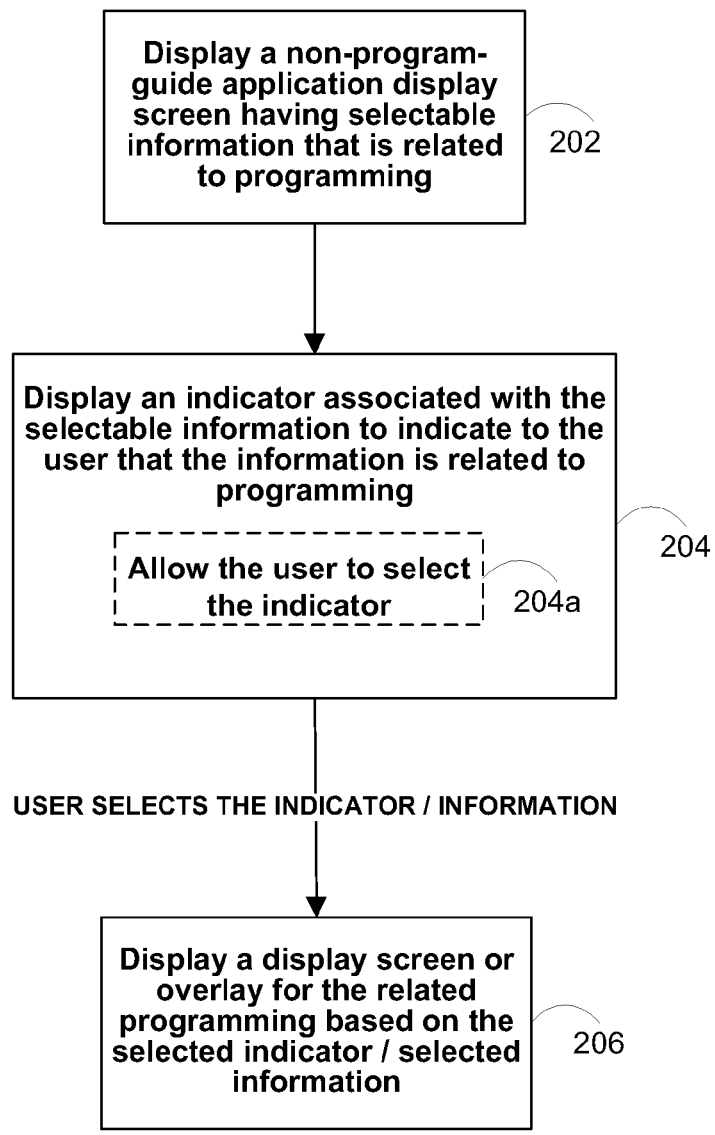
FIG. 17 is a flow chart of illustrative steps involved is providing an indicator for information that is related to programming in a non-program-guide application in accordance with the present invention.

Illustrative steps involved in using an indicator to display a display screen or overlay for related programming for use in an interactive television system, such as system 50 of FIG. 1, are shown in FIG. 17. At step 202, a non-program-guide display screen having information that is selectable and related to programming may be displayed. At step 204, an indicator that is associated with the information may be displayed to indicate to the user that the information is related to programming. If desired, at step 204*a*, the user may be provided with an opportunity to select the indicator. When the user selects the information (or its associated indicator), a display screen or overlay may be displayed for programming that is related to the information at step 206.

Figure 18:
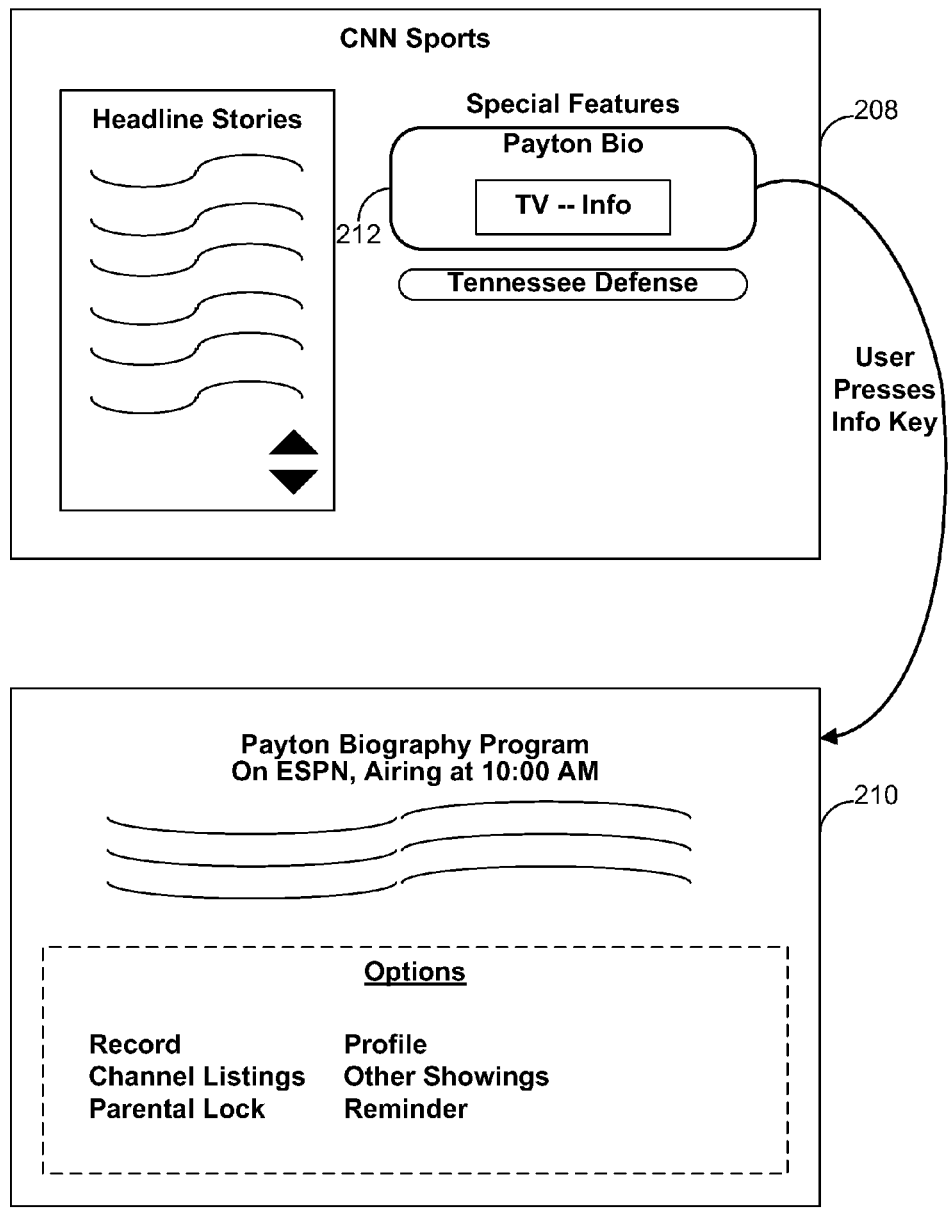
FIG. 18 is a diagram of an illustrative sequence of illustrative display screens that may be provided based on the illustrative steps of FIG. 17 in accordance with the present invention.

Illustrative sports news display screen 208 and illustrative programming display screen 210 of FIG. 18 may be displayed based on the illustrative steps of FIG. 17. Sports news displays screen 208 may include under the heading special features a listing for a Walter Payton Biography. The listing may include indicator 212 to indicate to a user that there is programming that is related to the on-screen information. Programming display screen 210 for the Walter Payton Biography program may be displayed when the user presses a remote control "info" key while Walter Payton Biography listing is highlighted in sports news display screen 208.

Figure 10:
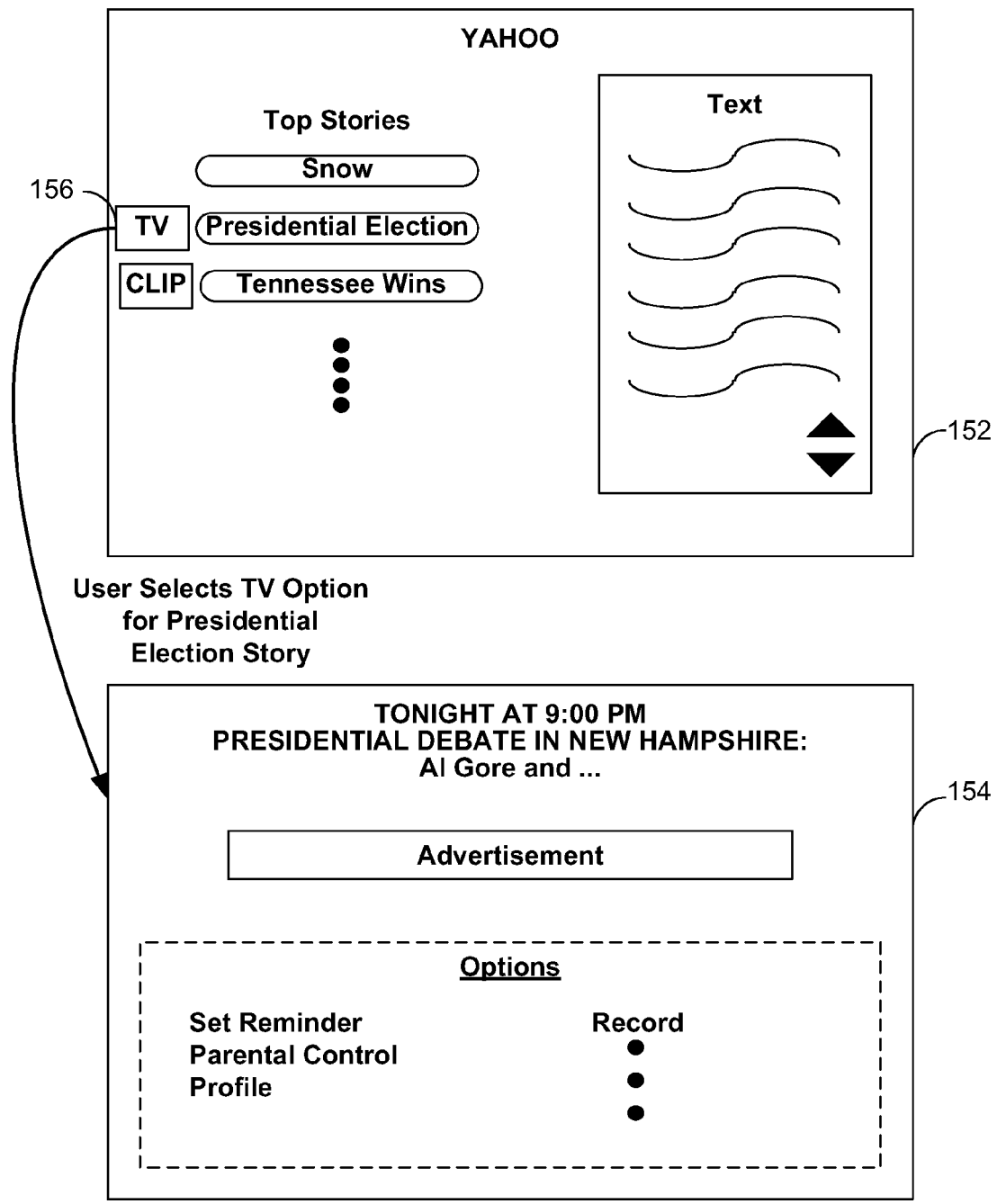
FIG. 10 is a diagram of an illustrative sequence of illustrative display screens that may be provided based on the illustrative steps of FIG. 4 in accordance with the present invention.

If desired, the illustrative display screens of FIG. 10 may be provided based on the illustrative steps of FIG. 17. For example, Link 156 that is associated with the presidential election story may be an indicator that causes information and options for a related program to be displayed when link 156 is selected.

The foregoing is merely illustrative of the principles of this invention and various modifications can be made by those skilled in the art without departing from the scope and spirit of the invention.

What is claimed is:

1. A method comprising:
   generating for display, in a first application, a selectable option that is related to a media asset, wherein the first application is configured to be invoked by a user independently of a second application;
   receiving a user selection of the selectable option;
   in response to receiving the user selection of the selectable option, retrieving information identifying the media asset; and
   directing the second application to retrieve media asset identifier information related to the media asset, based on the information identifying the media asset, for generating a display comprising a plurality of options, wherein each of the plurality of options corresponds to a media guidance function operable on the media asset, and wherein the first application and the second application are implemented on a same user device.

2. The method of claim 1, wherein the media guidance function operable on the media asset comprises at least one of:
   causing the media asset to be displayed;
   setting a reminder for the media asset;
   recording the media asset; and
   storing information associated with the media asset to a user profile.

3. The method of claim 1, wherein the display comprising the plurality of options is generated for display by the second application in an overlay.

4. The method of claim 1, further comprising:
   directing the second application to retrieve, from a remote server over an internet communications path, the media asset identifier information related to the media asset.

5. The method of claim 1, further comprising:
   generating for display, in an overlay in the first application, the selectable option that is related to the media asset.

6. A system comprising:
   a processor operative to:
      generate for display, in a first application, a selectable option that is related to a media asset, wherein the first application is configured to be invoked by a user independently of a second application;
      receive a user selection of the selectable option;
      in response to receiving the user selection of the selectable option, retrieve information identifying the media asset; and
      direct the second application to retrieve media asset identifier information related to the media asset, based on the information identifying the media asset, for generating a display comprising a plurality of options, wherein each of the plurality of options corresponds to a media guidance function operable on the media asset, and wherein the first application and the second application are implemented on a same user device.

7. The system of claim 6, wherein the media guidance function operable on the media asset comprises at least one of:
   causing the media asset to be displayed;
   setting a reminder for the media asset;
   recording the media asset; and
   storing information associated with the media asset to a user profile.

8. The system of claim 6, wherein the display comprising the plurality of options is generated for display by the second application in an overlay.

9. The system of claim 6, wherein the processor is further operative to:
direct the second application to retrieve, from a remote server over an internet communications path, the media asset identifier information related to the media asset.

10. The system of claim 6, wherein the processor is further operative to:
generate for display, in an overlay in the first application, the selectable option that is related to the media asset.

11. A method comprising:
receiving from a first application, with a second application, at least one parameter identifying a media asset, wherein the at least one parameter is received responsive to a user selection of a first option, related to the media asset, generated for display by the first application; and
in response to receiving the at least one parameter, generating, with the second application, for display a second option related to the media asset for performing a media guidance function corresponding to the media asset, wherein the first application is configured to be invoked by a user independently of the second application, and wherein the first application and second application are implemented on a same user device.

12. The method of claim 11, wherein the media guidance function comprises at least one of:
causing the media asset to be displayed;
setting a reminder for the media asset;
recording the media asset; and
storing information associated with the media asset to a user profile.

13. The method of claim 11, further comprising:
generating, with the second application, for display the second option related to the media asset in an overlay.

14. The method of claim 11, further comprising:
retrieving, from a remote server over an internet communications path, media asset identifier information related to the media asset.

15. The method of claim 11, wherein the first option related to the media asset is generated for display in an overlay by the first application.

16. A system comprising:
a processor operative to:
receive from a first application, with a second application, at least one parameter identifying a media asset, wherein the at least one parameter is received responsive to a user selection of a first option, related to the media asset, generated for display by the first application; and
in response to receiving the at least one parameter, generate, with the second application, for display a second option related to the media asset for performing a media guidance function corresponding to the media asset, wherein the first application is configured to be invoked by a user independently of the second application, and wherein the first application and second application are implemented on a same user device.

17. The system of claim 16, wherein the media guidance function comprises at least one of:
causing the media asset to be displayed;
setting a reminder for the media asset;
recording the media asset; and
storing information associated with the media asset to a user profile.

18. The system of claim 16, wherein the processor is further operative to:
generate, with the second application, for display the second option related to the media asset in an overlay.

19. The system of claim 16, wherein the processor is further operative to:
retrieve, from a remote server over an internet communications path, media asset identifier information related to the media asset.

20. The system of claim 16, wherein the first option related to the media asset is generated for display in an overlay by the first application.

* * * * *